United States Patent
Kato

(10) Patent No.: US 9,854,056 B2
(45) Date of Patent: Dec. 26, 2017

(54) MANAGING SYSTEM AND MANAGING METHOD FOR TRANSFERRING DATA BETWEEN TENANTS

(71) Applicant: CANON KABUSHIKI KAISHA, Tokyo (JP)

(72) Inventor: Kazunori Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 14/687,004

(22) Filed: Apr. 15, 2015

(65) Prior Publication Data

US 2015/0304446 A1 Oct. 22, 2015

(30) Foreign Application Priority Data

Apr. 16, 2014 (JP) ................................ 2014-084966

(51) Int. Cl.
  *G06F 15/173* (2006.01)
  *H04L 29/08* (2006.01)
  *H04L 12/24* (2006.01)
  *H04L 29/06* (2006.01)

(52) U.S. Cl.
  CPC .......... *H04L 67/2852* (2013.01); *H04L 41/08* (2013.01); *H04L 41/084* (2013.01); *H04L 63/101* (2013.01); *H04L 67/2842* (2013.01); *H04L 67/02* (2013.01); *H04L 67/10* (2013.01)

(58) Field of Classification Search
  CPC . H04L 67/2852; H04L 67/2842; H04L 41/08; H04L 41/084; H04L 63/10
  See application file for complete search history.

(56) References Cited

U.S. PATENT DOCUMENTS

| | | | | |
|---|---|---|---|---|
| 9,350,599 B1* | 5/2016 | Enright | .................... | G06F 21/43 |
| 2008/0080526 A1* | 4/2008 | Gounares | ................ | H04L 41/50 370/401 |
| 2011/0302133 A1 | 12/2011 | Kuruganti et al. | | |
| 2013/0238641 A1* | 9/2013 | Mandelstein | ......... | G06F 17/303 707/756 |

(Continued)

FOREIGN PATENT DOCUMENTS

| JP | 2010-108170 A | 5/2010 |
|---|---|---|
| JP | 2013-196649 A | 9/2013 |

OTHER PUBLICATIONS

Tetsuya Matsumoto, U.S. Appl. No. 14/686,883, entitled: "Managing System and Managing Method", filed Apr. 15, 2015.

(Continued)

*Primary Examiner* — Nam Tran
(74) *Attorney, Agent, or Firm* — Carter, DeLuca, Farrell & Schmidt, LLP

(57) ABSTRACT

An instruction to delete a first managing tenant among managing tenants in a system is accepted. Information included in management information of the first managing tenant and customer information unique to a customer managed by the first managing tenant is held as transfer information of the first managing tenant, and is managed using an access authority assigned to information of the customer. The held transfer information of the first managing tenant is transferred to the second management tenant when the second management tenant is determined to be a destination of the transfer from the first managing tenant.

7 Claims, 21 Drawing Sheets

(56) References Cited

U.S. PATENT DOCUMENTS

| | | |
|---|---|---|
| 2013/0254362 A1 | 9/2013 | Iwase |
| 2013/0326064 A1 | 12/2013 | Gulati et al. |
| 2014/0211232 A1* | 7/2014 | Ganesan ............... G06F 3/1207 |
| | | 358/1.14 |
| 2015/0213285 A1 | 7/2015 | Malko et al. |

OTHER PUBLICATIONS

U.S. office action issued in corresponding application No. 14/686,883, dated Jan. 13, 2017.

* cited by examiner

| | TENANT ID 501 | TENANT TYPE 502 | ADMINISTRATOR ID 503 | STATE 504 | CANCELLATION REJECTION ABLE PERIOD 505 | FIRST GRACE PERIOD 506 | SECOND GRACE PERIOD 507 |
|---|---|---|---|---|---|---|---|
| 511 | SP_US | SERVICE PROVIDER | tony | OPERATIONAL | | | |
| 512 | SP_NY | SERVICE PROVIDER | choi | CONFIRMING CANCELLATION | 2014/4/24 | | |
| 513 | SP_EAST | SERVICE PROVIDER | kato | OPERATIONAL | | | |
| 514 | SP_DET | SERVICE PROVIDER | kato | CANCELED | | | |
| 518 | ABC_Corp | CUSTOMER | admin | SERVICE BEING PROVIDED | | | |
| 519 | REV_NY | CUSTOMER | sara | SERVICE NOT YET STARTED | | | |
| 520 | XRC_US | CUSTOMER | suzuki | SERVICE BEING PROVIDED | | | |
| 521 | DET_BOOK | CUSTOMER | suzuki | SERVICE STOPPED | | 2014/3/21 | 2014/6/21 |

| | TENANT ID 531 | USER ID 532 | PASSWORD 533 | EMAIL ADDRESS 534 |
|---|---|---|---|---|
| 541 | SP_US | tony | xxxxxx | tony@sp-us.com |
| 542 | SP_NY | choi | yyyyy | choi@sp-ny.com |
| 543 | SP_EAST | kato | zzzzzz | kato@sp-east.com |
| 544 | ABC_Corp | suzuki | zzzzzz | suzuki@abc.com |
| 545 | REV_NY | andi | zzzzzz | andi@rev-ny.com |
| 546 | XRC_US | weer | zzzzzz | weer@xrc-us.com |

| | HIGHER TENANT 601 | LOWER TENANT 602 |
|---|---|---|
| 611 | SP_ROOT | SP_US |
| 612 | SP_ROOT | SP_EAST |
| 613 | SP_US | SP_NY |
| 614 | SP_US | SP_DET |

| CUSTOMER TENANT | SERVICE PROVIDER TENANT | ACCESS PERMISSION STATE |
|---|---|---|
| ABC_Corp | SP_NY | PERMITTED |
| REV_NY | SP_NY | NOT PERMITTED |
| XRC US | SP_NY | PERMITTED |
| XRC ST | SP_DET | PERMITTED |

Table_name=ABC_Corp.device_info

| DEVICE ID | IP ADDRESS | INSTALLATION LOCATION | MONITORING CONDITIONS | NOTIFICATION DESTINATION EMAIL ADDRESS | AGENT ID |
|---|---|---|---|---|---|
| 12345AAA | 172.24.2.122 | SETAGAYA OFFICE 1F | ERROR; OUT OF CONSUMABLE ITEM | choi@spny.com | agent_a |
| 23456BDS | 172.24.2.156 | SETAGAYA OFFICE 2F | ERROR; OUT OF CONSUMABLE ITEM | choi@spny.com | agent_b |
| 43424GAG | 172.24.2.134 | KAMATA OFFICE 3F | ERROR | joe@spny.com | agent_c |

FIG. 8B

Table_name=ABC_Corp.agent_info

| AGENT ID | AUTHENTICATION KEY | INSTALLATION DATE/TIME |
|---|---|---|
| agent_a | qwerty | 2013/10/02 09:22::22 |
| agent_b | asdfgh | 2013/10/12 19:21::21 |

FIG. 9A

4051 Table_name=SP_NY.customer_info

| CUSTOMER TENANT ID (901) | CUSTOMER NAME (902) | CUSTOMER CONTACT (903) | SALESPERSON (904) |
|---|---|---|---|
| ABC_Corp | ABC CORPORATION | 045-000-000x | Tom |
| REV_NY | REV NewYork | 041-111-111x | Mie |
| XRC US | XeRiCa US | 042-111-111x | Joe |

4051 Table_name=SP_NY.create_report_settings

| CUSTOMER TENANT ID (921) | REPORT TEMPLATE ID (922) | TEMPLATE FILE (923) | REPORT GENERATION DATE (924) |
|---|---|---|---|
| ABC_Corp | Standard_2 |  | 25 |
| REV_NY | Custom | REV_NY.temp | END OF THE MONTH |
| XRC US | Standard_2 |  | 20 |

Table_name=ABC_Corp.migration_data

| DataID | Data |
|---|---|
| SP_DATA | <data><br><customer_info><br><CUSTOMER NAME> ABC CORPORATION</CUSTOMER NAME><br><CUSTOMER CONTACT>045-000-000x</CUSTOMER CONTACT><br></customer_info><br><create_report_settings><br><REPORT TEMPLATE ID>Standard_2</REPORT TEMPLATE ID><br><REPORT CREATION DATE>25</REPORT CREATION DATE><br></create_report_settings><br></data> |

| | USER ID : tony@SP_US | HOME |

HOME > SERVICE PROVIDER MANAGEMENT

SERVICE PROVIDER MANAGEMENT

MANAGING SERVICE PROVIDERS

SERVICE PROVIDER LIST

[ ADD SERVICE PROVIDER> ] ~1501

| SERVICE PROVIDER TENANT ID (1502) | STATE (1503) | 1505 | NUMBER OF CONTRACTED CUSTOMERS (1504) | |
|---|---|---|---|---|
| SP_NY | OPERATIONAL | [CANCELED>] | 3 | ~1506 |
| SP_DET | CANCELED | [CANCELED>] | 1 | ~1507 |

| SP_NY | CONFIRMING CANCELLATION | 3 | ~1508 |

| SP_NY | CANCELED | 3 | ~1509 |

| | USER ID : choi@SP_NY | HOME |

SERVICE PROVIDER CONTRACT CANCELLATION CONFIRMATION

A HIGHER SERVICE PROVIDER HAS INSTRUCTED
THE CANCELLATION OF SYSTEM USE.
APPROVE?

[ APPROVE CANCELLATION ] 1511      [ REJECT CANCELLATION ] 1512

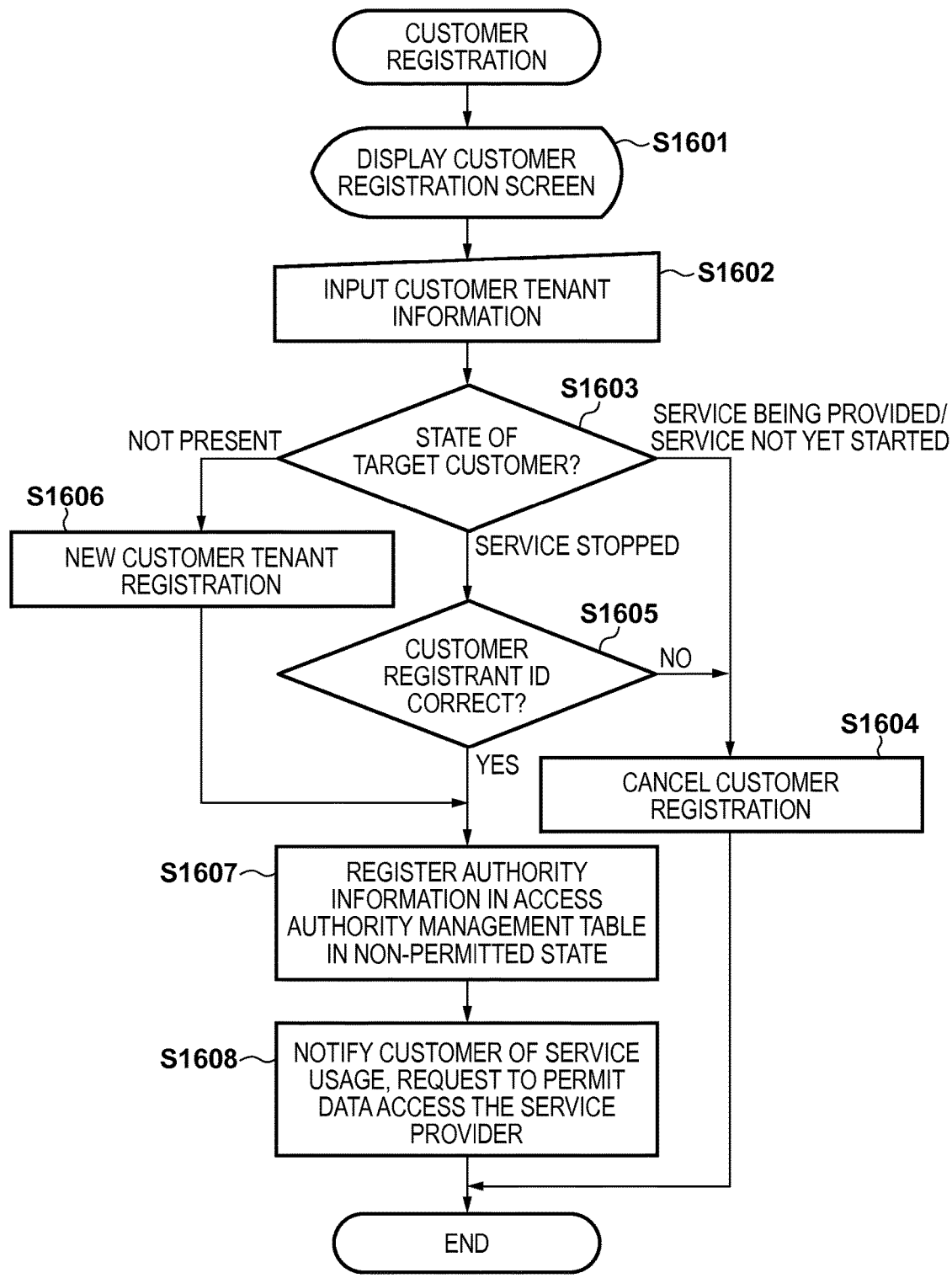

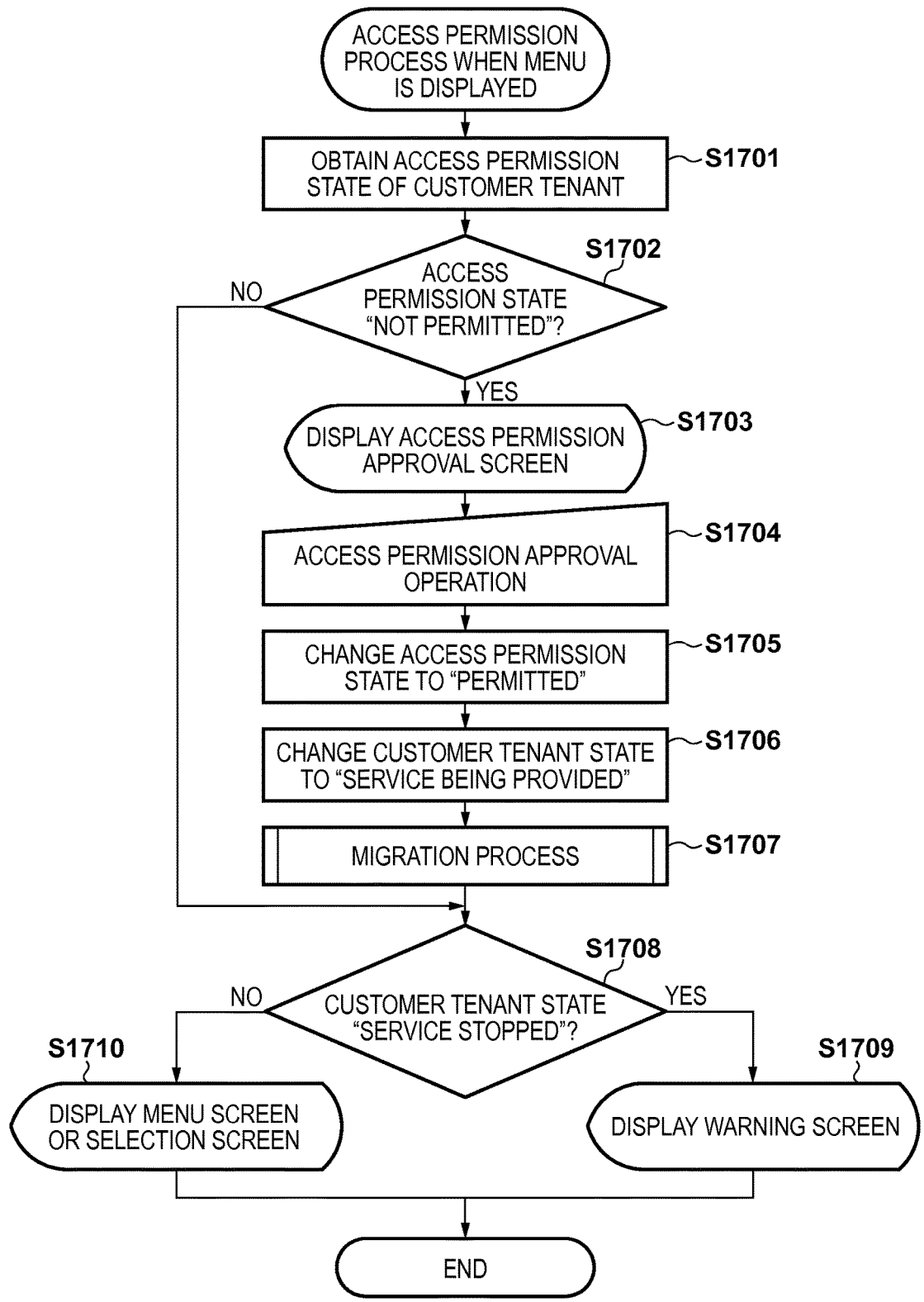

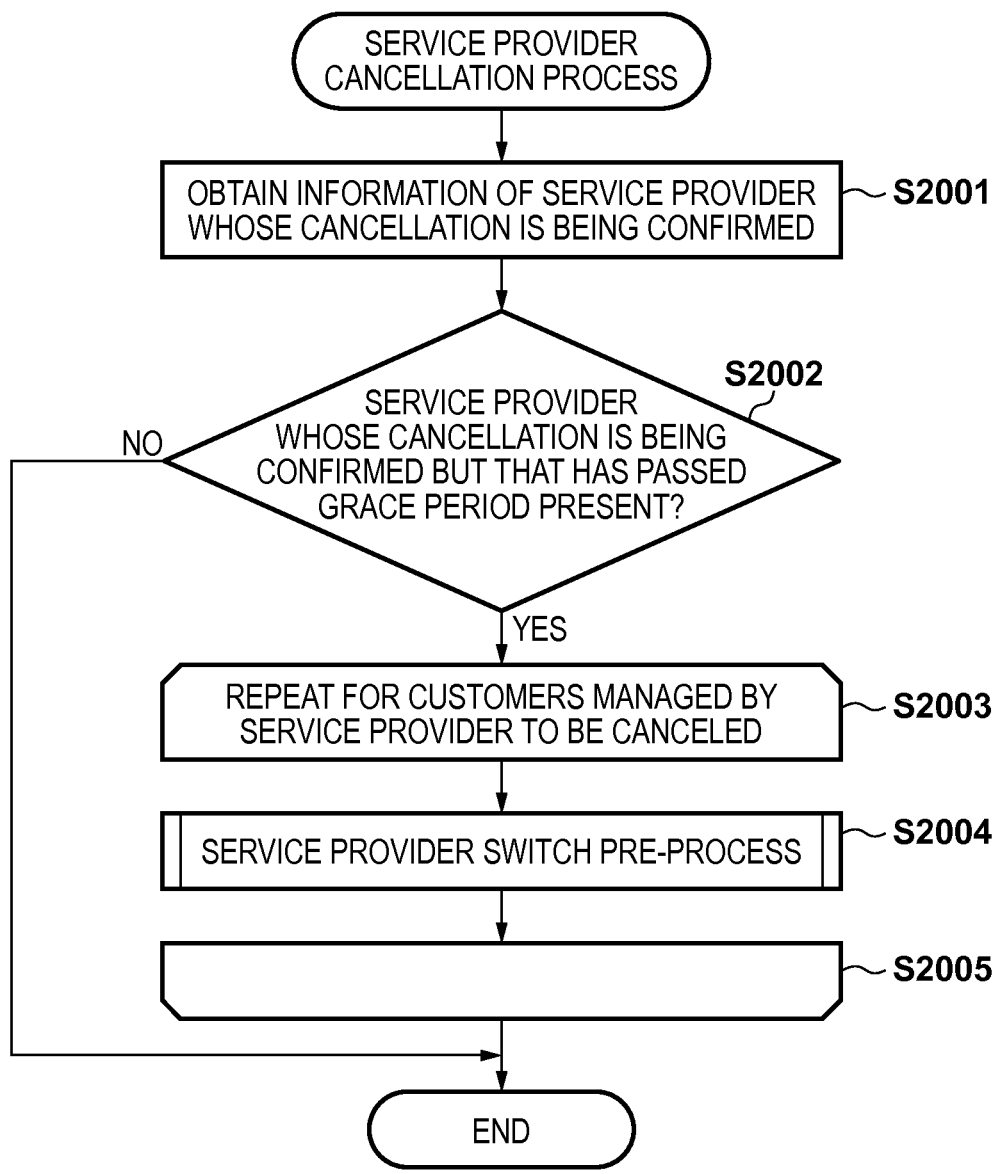

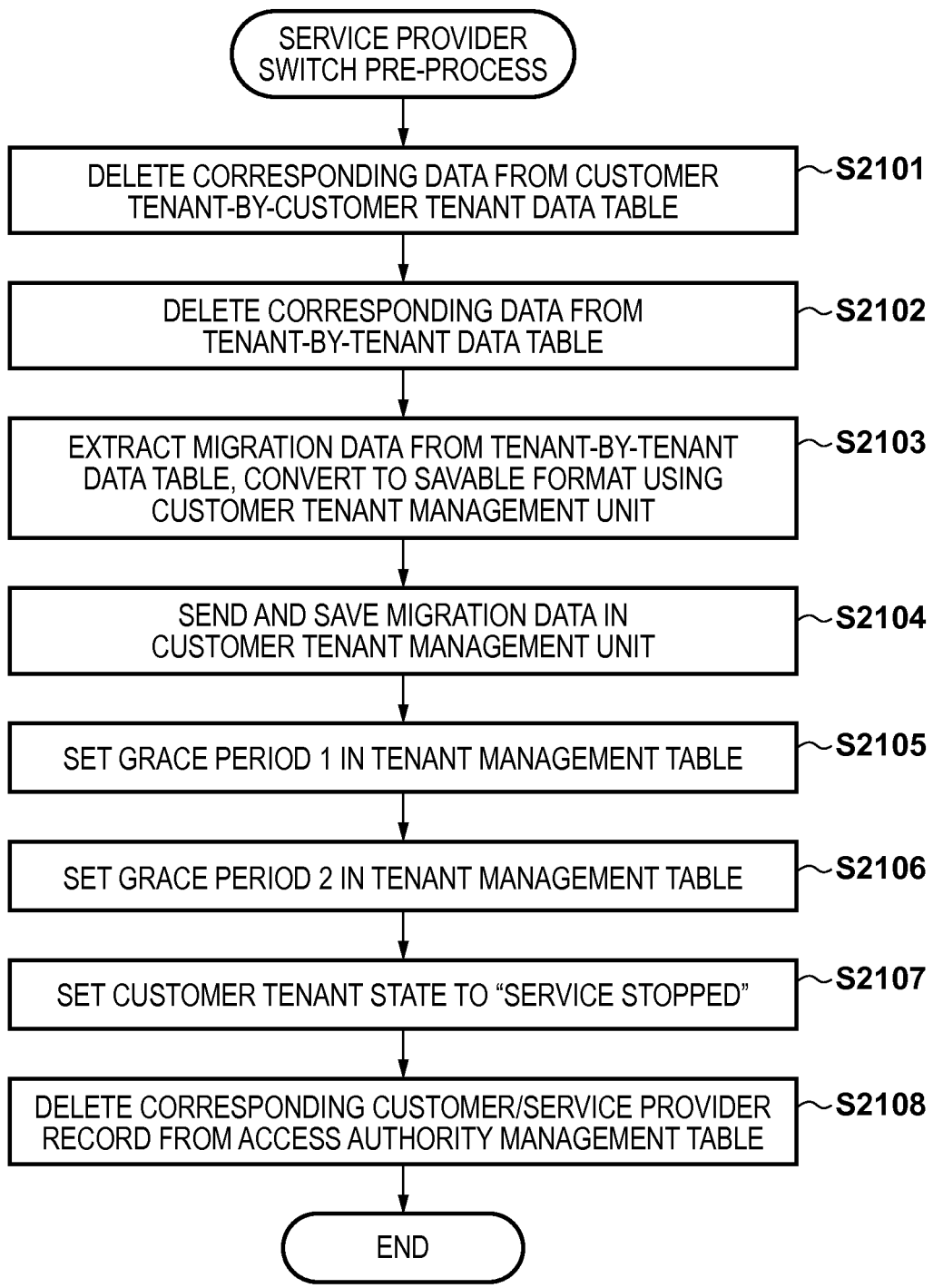

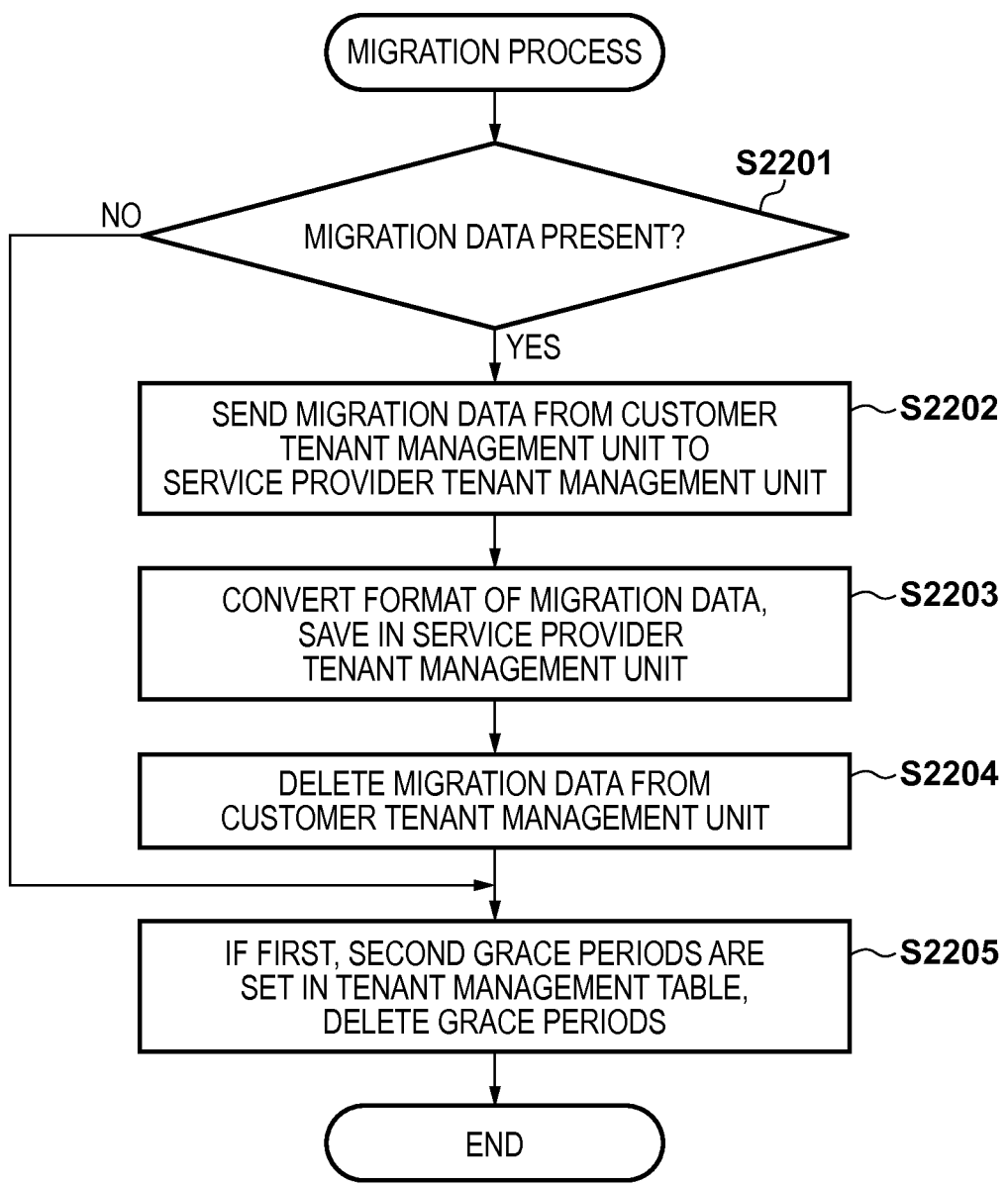

MANAGING SYSTEM AND MANAGING METHOD FOR TRANSFERRING DATA BETWEEN TENANTS

BACKGROUND OF THE INVENTION

Field of the Invention

The present invention relates to managing systems and managing methods for managing tenants.

Description of the Related Art

Generally, in a cloud-based service system, data storage, user information, and the like is managed in units called tenants, which corresponds to a dedicated area in the system for each customer. A customer tenant held by a customer such as a business or the like, a service provider tenant that provides management/repair services and the like for printers, multifunction peripherals, and the like to a customer, and so on can be given as examples of tenants.

Device configuration information data for printers, multifunction peripherals, and so on, status information data for devices, counter data for numbers of sheets used, status monitoring condition data for devices, notification destination information data used when an abnormal status is detected, and so on are saved in a customer tenant. Meanwhile, information such as customer names, customer contact details, salesperson names, and so on, report creation settings information data that uses a counter for a numbers of sheets used, and so on are saved in a service provider tenant. In a cloud-based service system, the data is managed in units of tenants, and thus a user can only access data within the tenant to which he or she belongs and cannot access other tenants.

Japanese Patent Laid-Open No. 2010-108170 discloses a role-based access control method. According to Japanese Patent Laid-Open No. 2010-108170, access is permitted on a role-by-role basis for respective data items and functions, and whether to permit or deny access to data objects and function objects is determined based on a role set for each user.

There are cases where a service provider that provides a service to a customer is removed from a system due to the service provider going bankrupt or the like. In the case where a service provider is removed, a new, second service provider that serves as a replacement will provide the service to the customer. There are also cases where the customer desires to switch to a second service provider even when the first service provider has not been removed from the system.

When switching service providers in this manner, it is necessary for the customer information that had been managed by the first service provider to be migrated to the post-migration second service provider and continue to be used thereafter. However, there are cases where the customer information that had been managed by the first service provider contains information that is not to be migrated to the second service provider. Such information is, for example, personal information, confidential information, and so on such as notification destination information data used when an abnormal status is detected, salesperson names, and so on. On the other hand, the data that can be migrated is device status monitoring condition data, customer names and customer contact details, report creation settings information data that uses a counter for a numbers of sheets used, and so on, for example.

Meanwhile, in the case where the first service provider ceases to exist due to bankruptcy or the like, it is undesirable from the standpoint of security to continue to save the aforementioned types of data in a state in which there is no managing service provider. However, the data cannot be easily deleted from the system before switching to the new second service provider that serves as the replacement.

SUMMARY OF THE INVENTION

An aspect of the present invention is to eliminate the above-mentioned problems with the conventional technology. The present invention provides a managing system and a managing method that, when transferring data between tenants, correctly transfer the data in accordance with the tenants subject to the transfer.

The present invention in one aspect provides a managing system, a managing system for using a managing tenant to manage information for managing a customer that uses a service in the system, the system comprising: an accepting unit configured to accept an instruction to delete a first managing tenant from the managing system; a holding unit configured to hold information included in management information of the first managing tenant and customer information unique to a customer managed by the first managing tenant as transfer information of the first managing tenant; and a transfer unit configured to transfer the transfer information of the first managing tenant held by the holding unit to a second management tenant in a case where the second management tenant is determined to be a destination of a transfer from the first managing tenant, the holding unit manages the transfer information using an access authority assigned to the information of the customer.

According to the present invention, when transferring data between tenants, the data can be correctly transferred in accordance with the tenants subject to the transfer.

Further features of the present invention will become apparent from the following description of exemplary embodiments (with reference to the attached drawings).

BRIEF DESCRIPTION OF THE DRAWINGS

FIGS. 5A and 5B are diagrams illustrating a tenant management table.

FIG. 7 is a diagram illustrating an access authority management table.

FIGS. 8A and 8B are diagrams illustrating customer tenant-by-customer tenant data tables.

FIGS. 9A and 9B are diagrams illustrating tenant-by-tenant data tables.

FIG. 10 is a diagram illustrating a service provider tenant data management table.

FIGS. 15A and 15B are diagrams illustrating service provider management screens.

FIG. 16 is a diagram illustrating steps in a customer registration process.

FIG. 17 is a diagram illustrating steps in an access permission process when a menu is displayed.

FIG. 20 is a diagram illustrating steps in a cancellation process in the case where a cancellation rejection operation has not been carried out.

FIG. 21 is a diagram illustrating steps in a service provider switch pre-process indicated in S2004.

FIG. 22 is a diagram illustrating steps in a migration process indicated in S1707.

DESCRIPTION OF THE EMBODIMENTS

Figure 1:
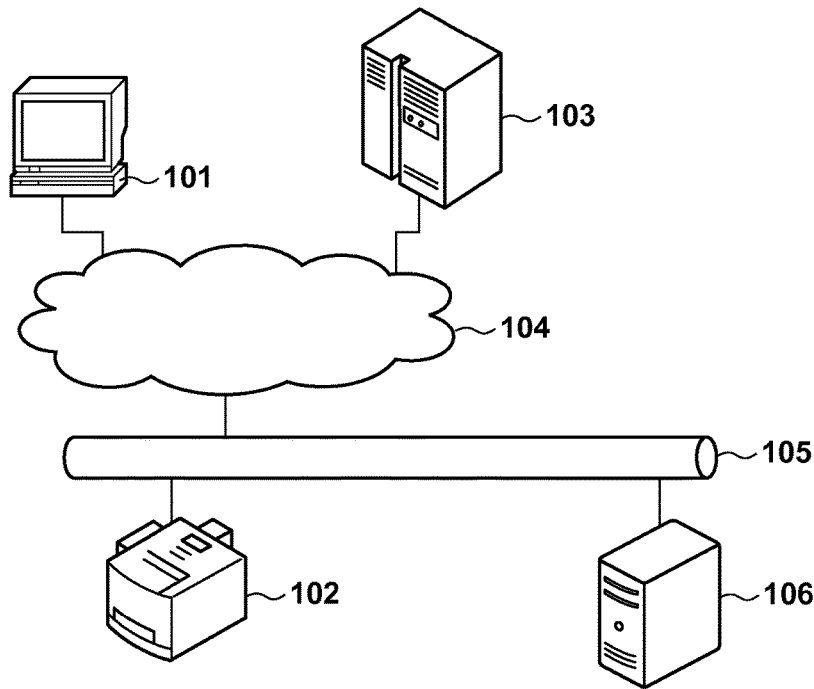
FIG. 1 is a diagram illustrating the configuration of a tenant managing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

System Configuration

A tenant managing system according to the present embodiment and illustrated in FIG. 1 includes a host computer 101, a peripheral device 102, a managing server 103, and a device management agent 106. This tenant managing system is used through a cloud-based service, for example. Generally, in a cloud-based service, data storage, user information, and the like is managed in units called tenants, which corresponds to a dedicated area in the system for each customer. For example, a customer that is a business or the like corresponds to a customer tenant, and a service provider that provides management/repair services and the like for printers, multifunction peripherals, and so on to a customer corresponds to a service provider tenant. Hereinafter, customer tenants and service provider tenants will be referred to collectively as managed tenants, or simply tenants.

A single service provider provides services to a plurality of customers, and thus a single service provider tenant is associated with a plurality of customer tenants. Here, there are cases where a hierarchical relationship is established among a plurality of service provider tenants. In addition, in the case where a customer includes a group of companies and a plurality of customer tenants are present, there are also cases where a hierarchical relationship is established among the customer tenants. A customer tenant user can delegate authority to access data saved in the customer tenant to another service provider (that is, can provide access authority). A service provider to which authority has been delegated can, based on that authority, provide services to the customer by referring to various types of data saved in the customer tenant, saving new data, and so on.

The managing server 103 illustrated in FIG. 1 is made public on a network 104 such as the Internet, and is capable of communicating with the host computer 101, the peripheral device 102, and the device management agent 106. The peripheral device 102 and the device management agent 106 are connected to a customer network 105 such as a LAN, and are connected to the network 104 through a firewall or the like.

The managing server 103 manages a plurality of service provider tenants, customer tenants, and so on, and manages user information of users belonging to the respective tenants (general users, businesses, or the like). Here, "tenant" corresponds to a predetermined unit for managing users in the system; for example, a customer tenant manages a predetermined number of general users, whereas a service provider tenant manages a predetermined number of customers (businesses or the like). Meanwhile, the managing server 103 identifies tenants to which users belong. The managing server 103 also manages data on a tenant-by-tenant basis, carries out user authentication upon being accessed by a user, and permits access to the data managed by the tenant to which the user belongs. Although the managing server 103 is illustrated as being constituted of a single server in FIG. 1, the functions of the managing server 103 may be realized by a plurality of apparatuses.

The host computer 101 is a generic PC operated by a service provider user (a user of a service provider tenant), a customer user (a user of a customer tenant), or the like, and is connected to the network 104. There are also cases where a firewall is present between the host computer 101 and the network 104. The peripheral device 102 is, for example, a printer that receives print data from a PC (not shown) over the customer network 105 and prints onto a printing medium such as print paper using an electrophotographic recording technique, and ink jet recording technique, or the like. Here, the peripheral device 102 may be a multifunction peripheral (MFP) having, for example, a copying function that optically reads a paper document via a scanner, a transmission function for converting an image into image data and sending the data via email or the like, and so on. In the present embodiment, the managing server 103 manages peripheral devices 102 in association with each of a plurality of customers. The device management agent 106 communicates with the peripheral devices 102, collects device information from the peripheral devices 102 and transmits the device information to the managing server 103, and communicates with the peripheral devices 102 under the managing server 103.

The service provider user according to the present embodiment can access the managing server 103 by operating the host computer 101, and can register peripheral devices 102 on a customer-by-customer basis. The service provider user can also refer to information of the peripheral devices 102 managed on a customer-by-customer basis, and can instruct each peripheral device 102 to execute control commands. The service provider user can also manipulate customer data saved in the managing server 103, and can register new customer tenants in the managing server 103.

Meanwhile, the customer user according to the present embodiment can access the managing server 103 by operating the host computer 101, and can accept services from service providers. The customer user can also download service reports transmitted from service providers to the host computer 101 and refer to those reports. A "service report" is a report containing information such as the type of a provided service, an execution history, and so on, and is created from a template that is unique to each service provider. Multiple host computers 101 may be present as well, one for each service provider user, each customer user, and so on.

The device management agent 106 periodically communicates with the managing server 103, checks whether the execution of a control command has been instructed, and receives and executes the command in the case where the command has been instructed. The device management agent 106 executes the control command, collects device information of the peripheral device 102 in the customer environment using the SNMP protocol or the like, and changes settings in the peripheral device 102. The customer user can accept a device management/repair service from the service provider via the device management agent 106.

Hardware Configurations of Respective Apparatuses

Figure 2:
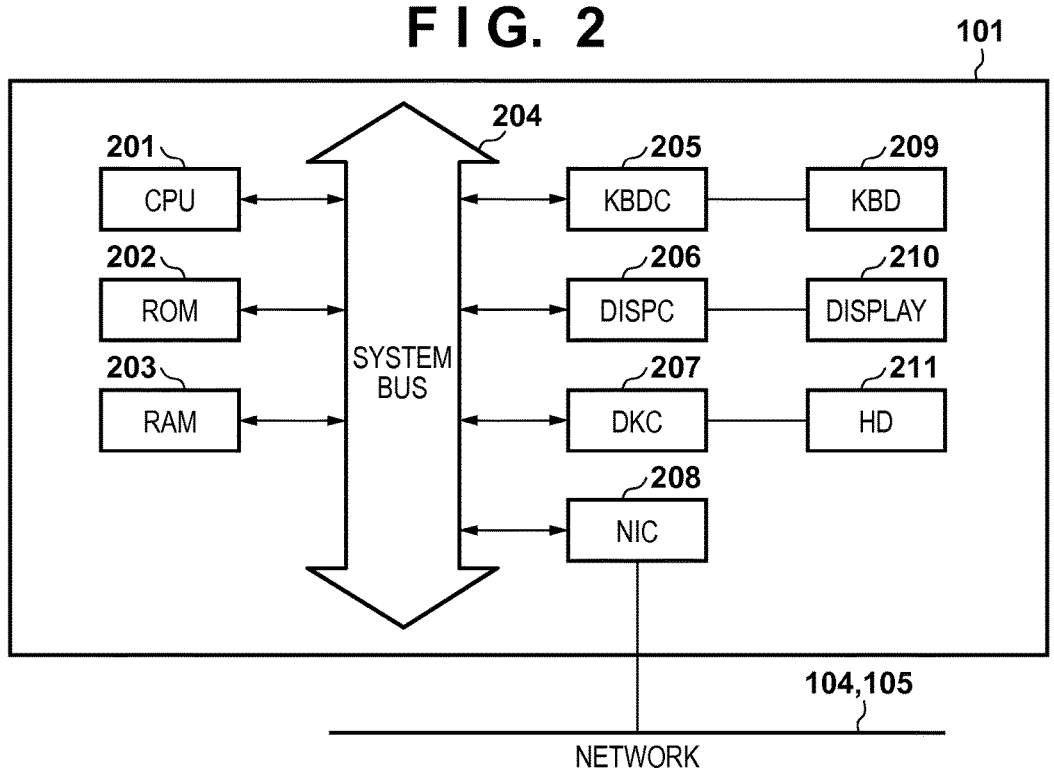
FIG. 2 is a block diagram illustrating the hardware configuration of respective apparatuses.

FIG. 2 is a block diagram illustrating the hardware configurations of the host computer 101, the device management agent 106, and the managing server 103. Although the host computer 101 is illustrated as an example in FIG. 2, the configurations of the other apparatuses are the same. The host computer 101, the device management agent 106, and the managing server 103 each includes a CPU 201 that executes programs stored in a ROM 202 or a hard disk (HD) 211, which is a large-scale storage device. The CPU 201 performs overall control of the respective blocks connected to a system bus 204. A RAM 203 functions as the main memory, a working area, and so on for the CPU 201. A keyboard controller (KBDC) 205 controls communication with a keyboard (KBD) 209. A display controller (DISPC) 206 controls communication with a display module (DISPLAY) 210 constituted of a liquid crystal display or the like. A disk controller (DKC) 207 controls communication with the hard disk 211. A network interface card (NIC) 208 controls communication with an external device via the network 104 or 105.

Functional Configuration of Host Computer 101

Figure 3A:
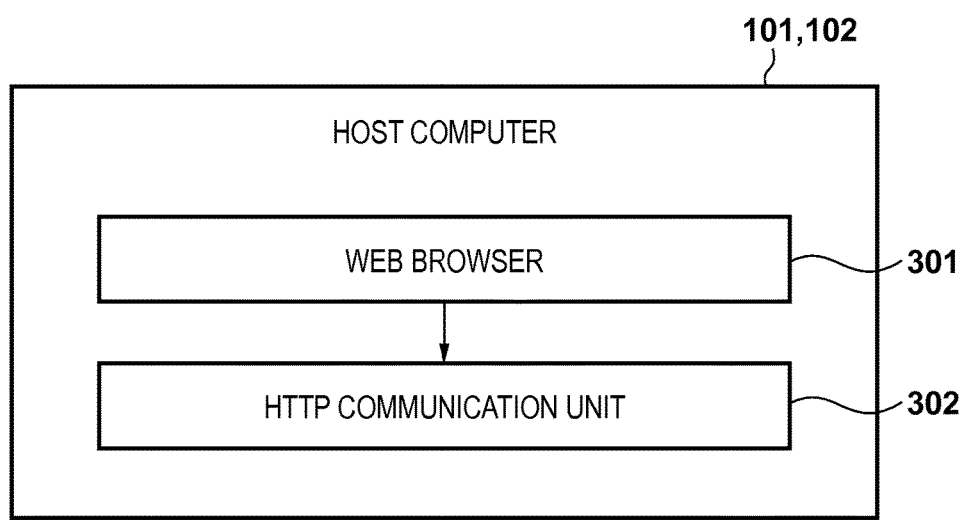
FIGS. 3A and 3B are block diagrams illustrating the functional configurations of a host computer and a device management agent.

FIG. 3A is a block diagram illustrating the functional configuration of the host computer 101 according to the present embodiment. The host computer 101 includes a Web browser 301 and an HTTP communication unit 302. The Web browser 301 analyzes HTML data and carries out control for displaying screens in the display module 210. The Web browser 301 accepts user operations from the keyboard 209 or the like, and sends communication requests to the HTTP communication unit 302. The HTTP communication unit 302 communicates with the managing server 103 via the NIC 208 through a protocol such as HTTP or HTTPS in response to the communication request from the Web browser 301, requests web page data and receives such data, and so on.

Functional Configuration of Device Management Agent 106

Figure 3B:
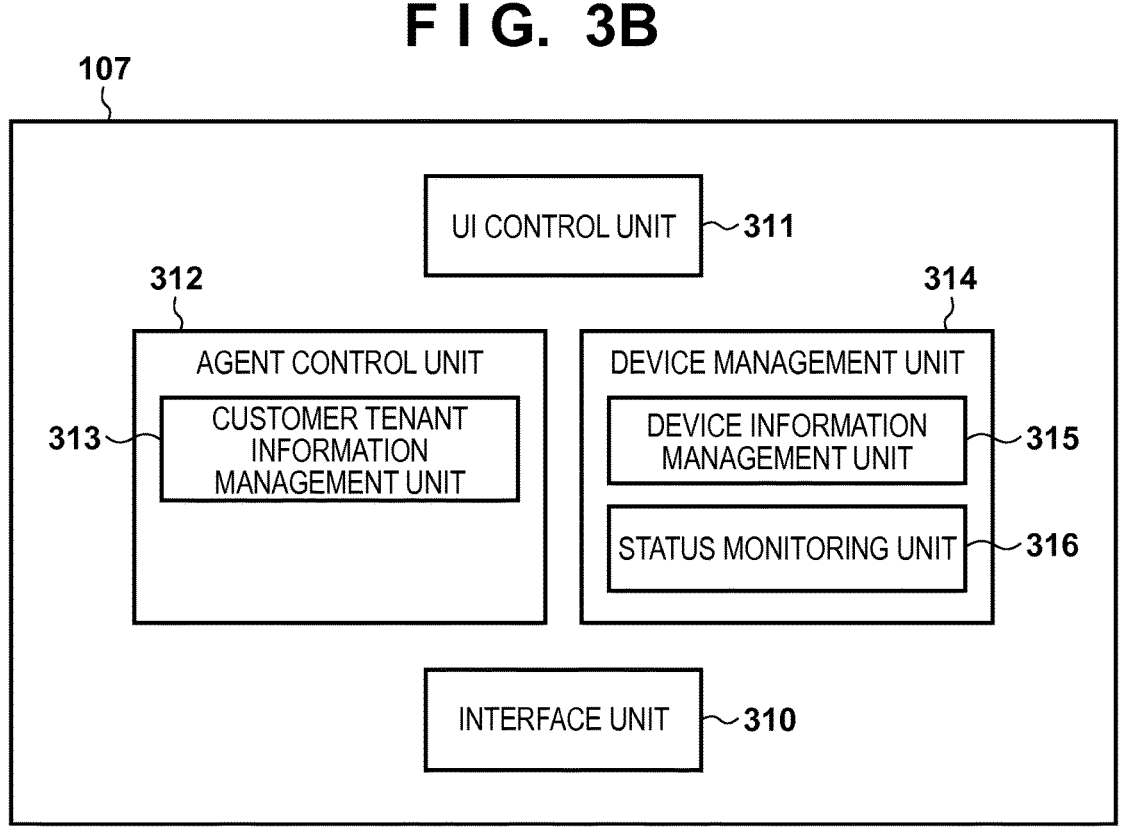

FIG. 3B is a block diagram illustrating the functional configuration of the device management agent 106 according to the present embodiment. The device management agent 106 includes an interface unit 310, a user interface (UI) control unit 311, an agent control unit 312, and a device management unit 314. The interface unit 310 communicates with the peripheral device 102, the managing server 103, and so on via the NIC 208 and the network 104 or 105. The UI control unit 311 carries out control for displaying screens in the display module 210, and accepts, from the keyboard 209, user operations for control carried out within displayed screens. In response to the details of the operations, the UI control unit 311 outputs user instructions to the agent control unit 312, the device management unit 314, and so on, and displays results of processes performed by the agent control unit 312, the device management unit 314, and so on in the display module 210.

The agent control unit 312 carries out a process for registering the device management agent 106 in the managing server 103. Upon detecting that a user has made an instruction to register an agent in the managing server 103, the UI control unit 311 notifies the agent control unit 312 of that instruction. The agent control unit 312 includes a customer tenant information management unit 313. The customer tenant information management unit 313 manages an ID of the customer tenant to which the device management agent 106 belongs, an agent ID for identifying the device management agent 106, and an authentication key for authenticating the device management agent 106. The authentication key is generated by the managing server 103 for each device management agent 106, and is sent to the device management agent 106. The device management agent 106 can obtain the authentication key after the process for registering the agent in the managing server 103 has succeeded. After obtaining the authentication key, the device management agent 106 generates signature data based on communication data using the authentication key, attaches the agent ID to the signature data, and sends the data/ID to the managing server 103. Upon receiving the communication data from the device management agent 106, the managing server 103 generates the signature data using the authentication key of the corresponding device management agent 106, and determines that the authentication has succeeded in the case where the generated signature data matches the received signature data. However, in the case where a first grace period 506 (mentioned later) has passed, the managing server 103 returns an operation unable error to the device management agent 106 even after the authentication has succeeded, and thereafter does not determine that the authentication has succeeded even if the signature data matches. Such control is carried out in the case where the managing server 103 restricts the operations performed by the device management agent 106.

The device management unit 314 obtains a list of peripheral devices 102 to be managed by the device management agent 106 from the managing server 103 via the interface unit 310. The device management unit 314 includes a device information management unit 315 and a status monitoring unit 316. The device information management unit 315 collects settings information, device information, and so on from the peripheral devices 102, and sends that information to the managing server 103. The status monitoring unit 316 obtains status information of the peripheral devices 102 through the SNMP protocol or the like, and sends that information to the managing server 103.

Functional Configuration of Managing Server 103

Figure 4:
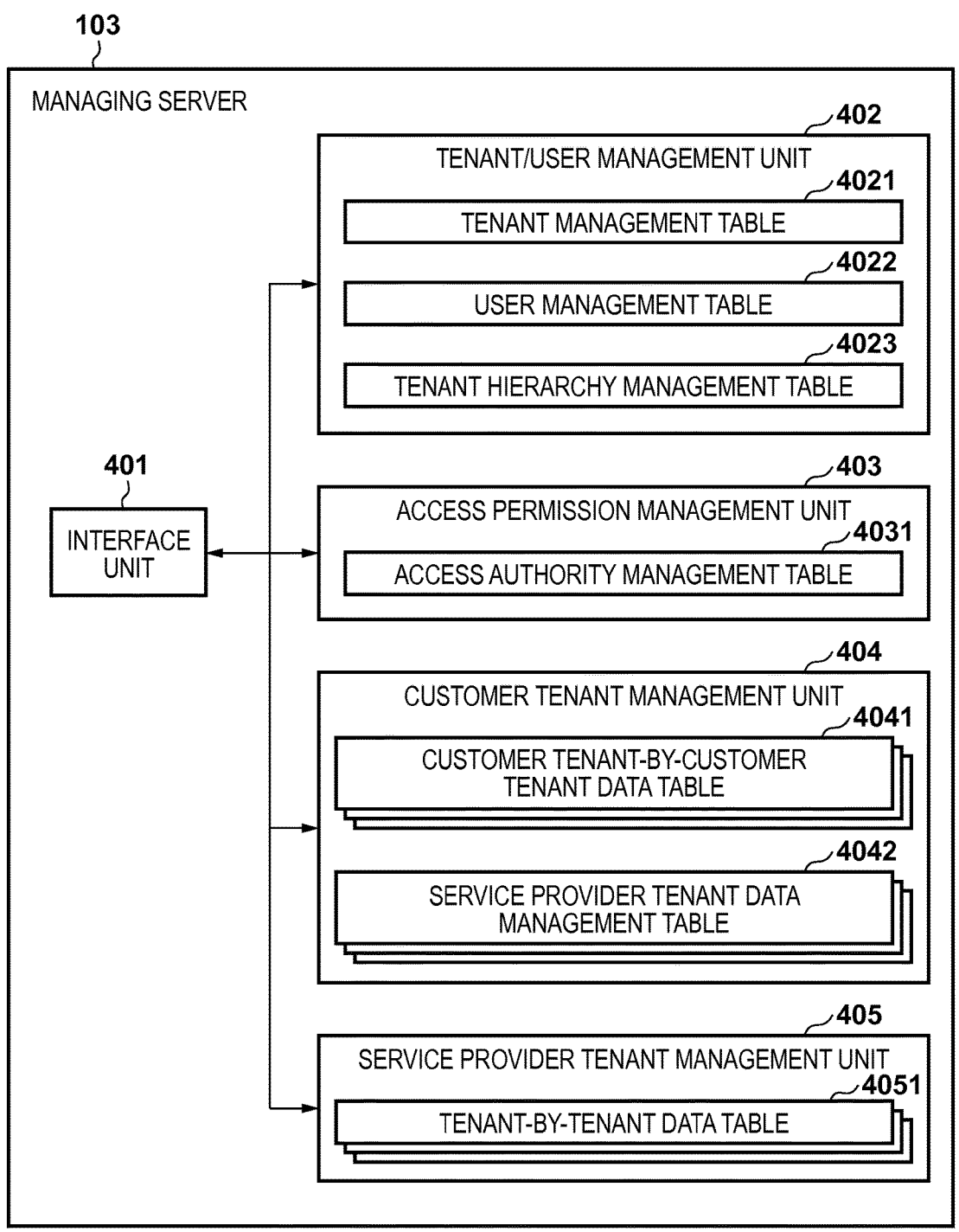
FIG. 4 is a block diagram illustrating the functional configuration of a managing server.

FIG. 4 is a block diagram illustrating the functional configuration of the managing server 103 according to the present embodiment. The managing server 103 includes an interface unit 401, a tenant/user management unit 402, an access permission management unit 403, a customer tenant management unit 404, and a service provider tenant management unit 405.

The interface unit 401 communicates with the host computer 101, the device management agent 106, and so on via the NIC 208 and the network 104. When a request for a Web page has been received from the host computer 101 through the HTTP or HTTPS protocol, the interface unit 401 determines an authentication result, an access permission state, and so on, and then responds with HTML data. Furthermore, when an HTTP or HTTPS request has been received from the device management agent 106, the interface unit 401 carries out authentication using the authentication key and then responds with XML data.

The tenant/user management unit 402 manages a tenant management table 4021, a user management table 4022, and a tenant hierarchy management table 4023, which will be described later, and carries out a user authentication process on a tenant-by-tenant basis, a process for identifying tenants to which users belong, and so on.

The access permission management unit 403 manages an access authority management table 4031, which will be described later, and manages request information regarding access permission from a service provider tenant to a customer tenant, approval information for access permission received from a customer tenant, and so on. An "access permission request" refers to, for example, a case where when a service provider is removed from the system due to bankruptcy or the like, a service provider tenant to which the service will be migrated makes an access permission request to a customer tenant that had been utilizing that service. The customer tenant is managed from the service provider tenant to which the customer tenant belongs, and thus access permission is necessary in the case where another service provider tenant is to access that customer tenant.

The customer tenant management unit 404 manages a customer tenant-by-customer tenant data table 4041 and a service provider tenant data management table 4042, which will be mentioned later. The service provider tenant management unit 405 manages a tenant-by-tenant data table 4051, which will be mentioned later. The customer tenant management unit 404 and the service provider tenant management unit 405 provide service functions such as device management, report generation, and so on to customer users, service provider users, and so on.

The customer tenant-by-customer tenant data table 4041, the service provider tenant data management table 4042, and the tenant-by-tenant data table 4051 constitute individual tables for each tenant (customer or service provider). Data belonging to the corresponding tenant is stored in each table. Tables are configured for each tenant by setting a name of the table to "<tenant ID>.<data table name>", for example. A plurality of tables may be configured for each data type. In such a case, tables can be configured for each tenant and each data type by setting a name of the table to "<tenant ID>.<table name>". The configuration may be such that all tenant data is stored in a single table. For example, the configuration may be such that tenant IDs are stored in one column of the table, and each row then indicates which tenant the data belongs to.

FIG. 9A is a diagram illustrating an example of the tenant-by-tenant data table 4051. FIG. 9A illustrates an example of a customer management table (customer_info) of a service provider SP_NY, and the table name is "SP_NY.customer_info". Customer tenant ID 901 in FIG. 9A indicates a customer tenant ID managed by the service provider SP_NY and to which a service is provided. Customer name 902, customer contact 903, and salesperson 904 are stored as information regarding the customer tenant indicated by the customer tenant ID 901 in that row. The configurations of the respective tables managed by the managing server 103 will be described next.

Tenant Management Table

FIG. 5A is a diagram illustrating an example of the tenant management table 4021. The tenant management table 4021 is a table for managing what sort of tenants (service provider tenants, customer tenants) are present in the tenant managing system, and what sort of state each of those tenants is in. Tenant ID 501 indicates identification information (an ID) for identifying the tenant. Tenant type 502 indicates whether each tenant is a tenant used by a service provider or a tenant used by a customer. Administrator ID 503 indicates an ID for identifying an administrator of the tenant. In FIG. 5A, a tenant 511, for example, is a service provider tenant whose tenant ID is "SP_US" and whose administrator ID is "tony". In the present embodiment, it is necessary to specify both the tenant ID and the administrator ID when accepting a specification of a tenant to be manipulated. Mistaken specifications are prevented by confirming that these match.

State 504 indicates a state of the customer tenant or the service provider tenant in that row. In the case of a service provider tenant, one of "operational", "confirming cancellation", and "canceled" is set as a state of a cancellation process. Meanwhile, in the case of a customer tenant, one of "service being provided", "service not yet started", and "service stopped" is set as a state of the service provided by the service provider. "Service not yet started" is set when the customer tenant has been registered by the service provider but an access request has not yet been approved by the customer tenant, and "service being provided" is set after the approval. "Service stopped" is set in the case where the service provider has been canceled.

Cancellation rejection able period 505 indicates a period in which, in the case where a cancellation instruction has been made to that service provider tenant from a service provider located higher in the hierarchy, the service provider can reject cancellation. "Higher", in the case where the plurality of tenants present in the system has a hierarchical structure, refers to a tenant located higher in the hierarchy. A higher tenant has the authority to permit access to information it manages itself from a lower tenant, for example.

First grace period 506 indicates a period in which the device management agent 106 can operate in the case where the service provider tenant providing a service to that customer tenant has been set to "canceled". Second grace period 507, meanwhile, indicates a period in which the customer tenant management unit 404 can manage the data of that customer in the same case.

User Management Table

FIG. 5B is a diagram illustrating an example of the user management table 4022. The user management table 4022 is a table for managing information of users that belong to a tenant. Tenant ID 531 indicates a tenant ID (a customer tenant ID or a service provider ID) for identifying the tenant to which the user belongs. User ID 532 indicates an ID for identifying the user, and is issued so as to be unique at least on a tenant-by-tenant basis.

Password 533 indicates a password input along with the user ID when the user logs into the system. Email address 534 indicates the user's email address, and indicates an email destination in the case where it is necessary to notify the user via email. In FIG. 5B, a tenant 541, for example, indicates a user who belongs to a tenant SP_US, has a user ID of tony, a password of xxxxxx, and an email address of tony@sp-us.com.

Tenant Hierarchy Management Table

Figures 6A, 6B:
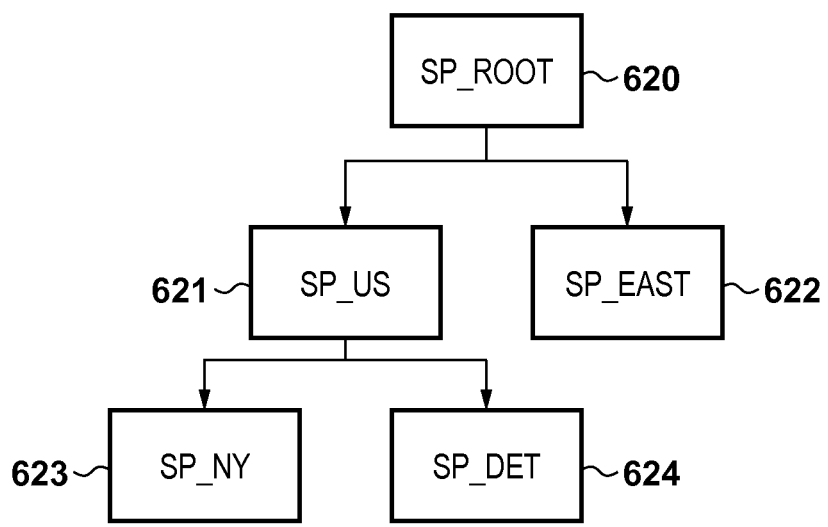
FIGS. 6A and 6B are diagrams illustrating a tenant hierarchy management table.

FIG. 6A is a diagram illustrating an example of the tenant hierarchy management table 4023. The tenant hierarchy management table 4023 is a table for managing the hierarchical relationship among the service provider tenants. FIG. 6A indicates that a service provider tenant corresponding to a higher tenant 601 is located higher in the hierarchy than a service provider tenant corresponding to a lower tenant 602. FIG. 6B is a diagram illustrating a tenant hierarchical structure expressed by the tenant hierarchy management table 4023 illustrated in FIG. 6A. A service provider tenant located higher in the hierarchy can, for example, give authority to access a customer tenant it manages itself to a service provider tenant located lower in the hierarchy.

Access Authority Management Table

FIG. 7 is a diagram illustrating an example of the access authority management table 4031. The access authority management table 4031 is a table for managing customer tenants, which service provider tenant has the authority to access that customer tenant, and the state of that permission.

Customer tenant 701 indicates a tenant ID for identifying a customer tenant having a resource such as data (including user information). Service provider tenant 702 indicates an ID of a service provider tenant having the authority to access the tenant indicated by the customer tenant 701. Access permission state 703 indicates whether or not the customer corresponding to the customer tenant 701 permits the service provider tenant 702 to access the resource.

At the point in time when the service provider has registered a customer tenant, a record is added with the access permission state 703 being "not permitted". In a state in which the access permission state 703 is "not permitted", it is determined that access is not yet permitted. When the access permission is then approved by the administrator of the customer tenant, the access permission state 703 is changed to "permitted", and the service provider tenant is permitted to access the resource of the customer tenant.

Customer Tenant-by-Customer Tenant Data Table

FIG. 8A illustrates an example of the customer tenant-by-customer tenant data table 4041, in which information of devices such as printers managed by the customer tenant is stored in particular. A table is prepared for each of the plurality of customer tenants by setting the table name of the customer tenant-by-customer tenant data table to "<tenant ID>.<table name>". The table name in FIG. 8A is ABC_Corp.device_info, indicating that the table is a device_info table for a device belonging to a tenant ABC_Corp.

Device ID 801 is an ID for identifying a device such as a printer managed by the customer tenant, and a serial number, a MAC address, or the like is set as the device ID. IP address 802 is an IP address serving as attribute information of the device. Installation location 803 indicates installation location information serving as attribute information of the device. Monitoring conditions 804 indicate monitoring conditions for the device, corresponding to error event information such as consumable items such as toner being exhausted, paper jams, and the like in the case where the device is a printer, for example. Notification destination email address 805 indicates an email address serving as a destination for a notification of the occurrence of a status (event) matching the monitoring conditions 804 in the case where such a status has occurred in the device. Management agent ID 806 indicates an identifier of the device management agent 106 that manages the device.

FIG. 8B illustrates an example of the customer tenant-by-customer tenant data table 4041, in which information of the device management agent 106 managed by the customer tenant is stored in particular. A table is prepared for each of the plurality of customer tenants by setting the table name of the customer tenant-by-customer tenant data table in FIG. 8B to "<tenant ID>.<table name>" as well. The table name in FIG. 8B is ABC_Corp.agent_info, indicating that the table is an agent_info table belonging to the tenant ABC_Corp.

Agent ID 821 is an ID for identifying the device management agent 106. Authentication key 822 is a signature key used for authentication when there is communication from the device management agent 106. Installation date/time 823 indicates a date/time at which the device management agent 106 was installed and registered in the managing server 103. The tables in FIGS. 8A and 8B, the number of records, the number of data strings, the structure of the data, and so on can be set as desired, and are not limited to the formats indicated in FIGS. 8A and 8B.

Tenant-by-Tenant Data Table

FIG. 9A is a diagram illustrating an example of the tenant-by-tenant data table 4051, in which management information of the customer tenants managed by a service provider tenant is stored in particular. The table name in FIG. 9A is SP_NY.customer_info, and information of the customer tenants managed by the tenant SP_NY is stored therein.

FIG. 9B is a diagram illustrating an example of the tenant-by-tenant data table 4051, in which customer information for report generation settings unique to each customer tenant managed by a service provider tenant is stored in particular. A report generated by a service provider includes, for example, a date/time and frequency at which a customer tenant used the service, the details of the service, and so on. Customer tenant ID 921 indicates an ID for identifying the customer tenant. Report template ID 922 indicates an ID for identifying template information used when generating the report. Here, in the case where the report template has been customized, a filename of the template is stored in template file 923. Meanwhile, report generation date 924 indicates information of a date at which the report is generated and provided by the service provider to the customer tenant each month. The tables in FIGS. 9A and 9B, the number of records, the number of data strings, the structure of the data, and so on can be set as desired, and are not limited to the formats indicated in FIGS. 9A and 9B.

Service Provider Tenant Data Management Table

FIG. 10 is a diagram illustrating an example of the service provider tenant data management table 4042. Although details will be given later, the service provider tenant data management table 4042 is a table obtained by obtaining only the service provider data to be transferred from the service provider tenant-by-tenant data table 4051 illustrated in FIGS. 9A and 9B and converting that data into a predetermined data format.

Processing Flow

Processing carried out by the host computer 101, the device management agent 106, and the managing server 103 will be described next.

User Authentication Process

When a user uses the Web browser 301 in the host computer 101 to specify a URL of the managing server 103, the Web browser 301 sends a screen display request to the managing server 103 specified by the URL via the network 104. Upon receiving the screen display request via the interface unit 401, the managing server 103 confirms session information using cookie information or the like, and determines whether the screen display request is a request that has already been authenticated. A user authentication process, illustrated in FIG. 11, is carried out in the case where the screen display request is a request that has not yet been authenticated.

Figure 11:
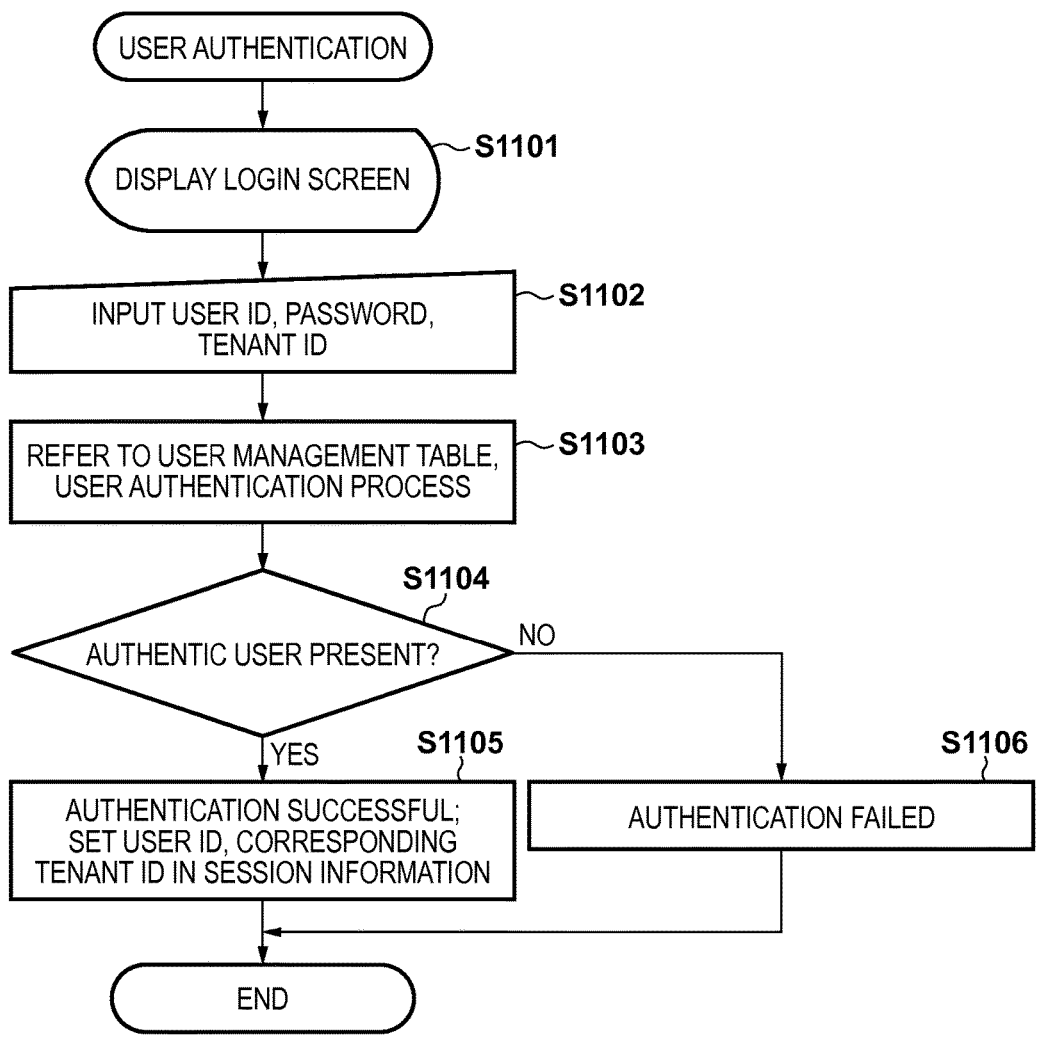
FIG. 11 is a diagram illustrating steps in a user authentication process.

FIG. 11 is a flowchart illustrating steps in the user authentication process. When the user authentication process starts, in S1101, the CPU 201 of the managing server 103 generates HTML data expressing a login screen and sends that data to the host computer 101 over the network 104. The host computer 101 receives the HTML data via the HTTP communication unit 302, analyzes the HTML data using the Web browser 301, and displays the login screen. In S1102, the host computer 101 accepts the input of a user ID, a password, and a tenant ID from the user through the login screen. The information that has been input is sent to the managing server 103 via the HTTP communication unit 302.

In S1103, the CPU 201 of the managing server 103 forwards the received user ID, password, and tenant ID to the tenant/user management unit 402. The CPU 201 refers to the user management table 4022 managed by the tenant/user management unit 402, and determines whether or not a user that matches those three pieces of information is present. Here, the process moves to S1105 in the case where it is determined that a matching user is present, and moves to S1106 in the case where it is determined that a matching user is not present.

In S1106, the CPU 201 generates HTML data for notifying the host computer 101 of a login failure, sends the data to the host computer 101, and then ends the process illustrated in FIG. 11. On the other hand, in S1105, the CPU 201 sets the user ID, the tenant ID of the tenant to which the user belongs, and the tenant type (customer tenant or service provider tenant) in the session information. At this time, role information associated with the authenticated user may also be set. The CPU 201 generates HTML data of a Web page requested by the host computer 101 based on the session information and sends the data to the host computer 101. Here, in the case where the Web page is not specified in particular, the CPU 201 generates HTML data for a home page based on the tenant type as described below and sends the data to the host computer 101.

Figure 12A:
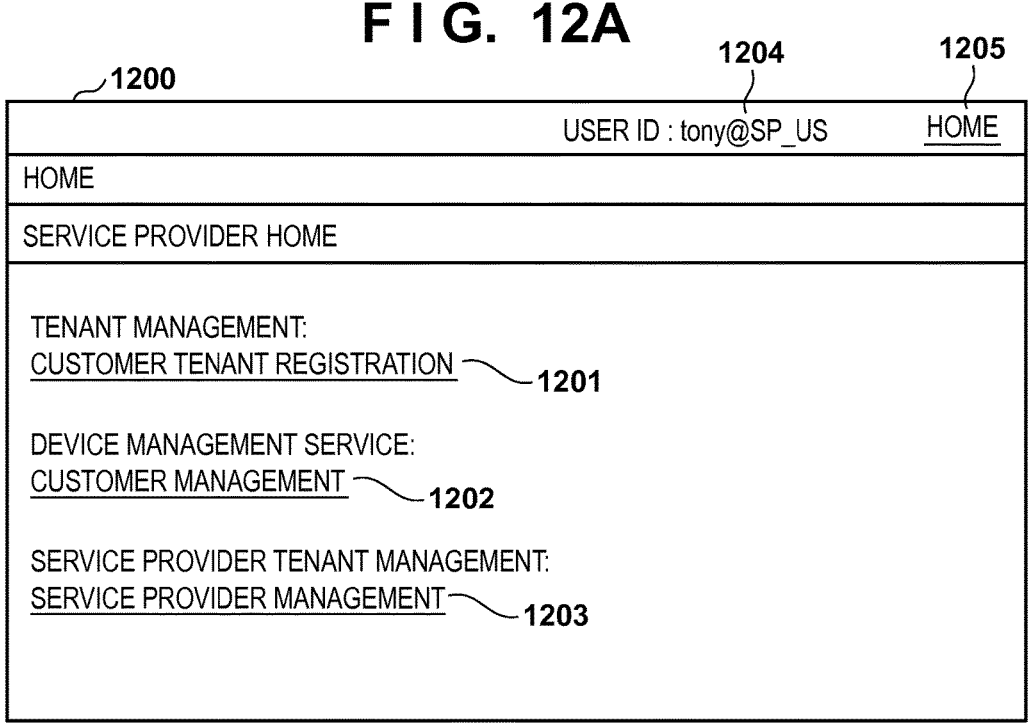
FIGS. 12A and 12B are diagrams illustrating service provider and customer homepages.

FIG. 12A is a diagram illustrating an example of a service provider home page 1200 displayed in the case where the user has logged into the service provider tenant. Item 1201 indicates a link to a customer tenant registration screen, and when this item is selected by the user using a pointer or the like, the screen transitions to a customer tenant registration screen 1300 such as that illustrated in FIG. 13.

Figure 14:
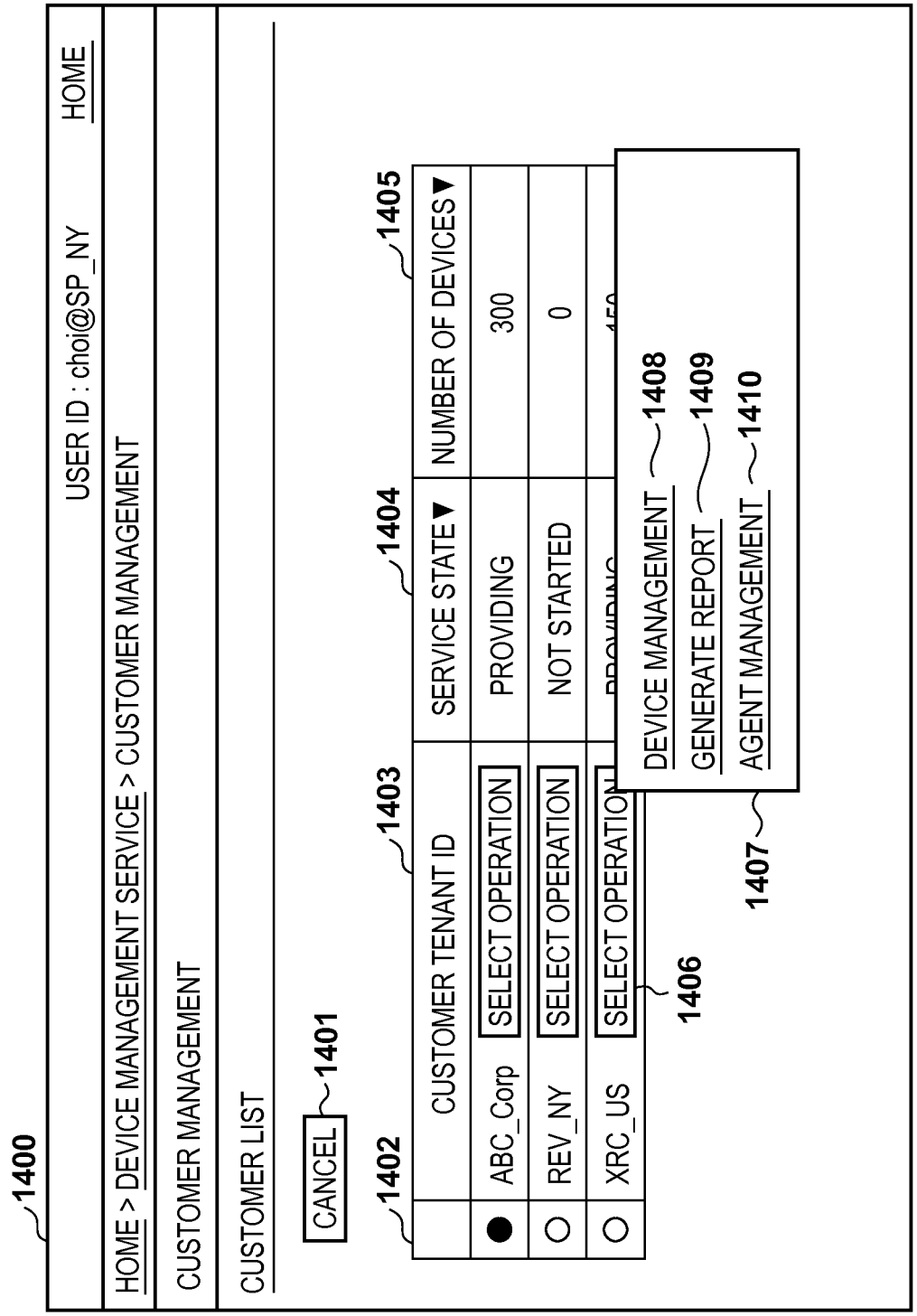
FIG. 14 is a diagram illustrating customer management in a device management service.

Item 1202 indicates a link to a device management service customer management screen, and when this item is selected by the user using a pointer or the like, the screen transitions to a device management service customer management screen 1400 such as that illustrated in FIG. 14. Item 1203 indicates a link to a service provider tenant management screen, and when this item is selected by the user using a pointer or the like, the screen transitions to a service provider management screen 1500 such as that shown in FIG. 15A.

Item 1204 indicates a display region for the username of the logged-in user who is displaying the home page screen. Item 1205 indicates a link to the home page screen, and when this item is selected by the user using a pointer or the like, the screen transitions to a home page screen 1200. The items 1204 and 1205 indicate controls that are displayed in other screens as well, and thus descriptions thereof will not be repeated below.

Figure 12B:
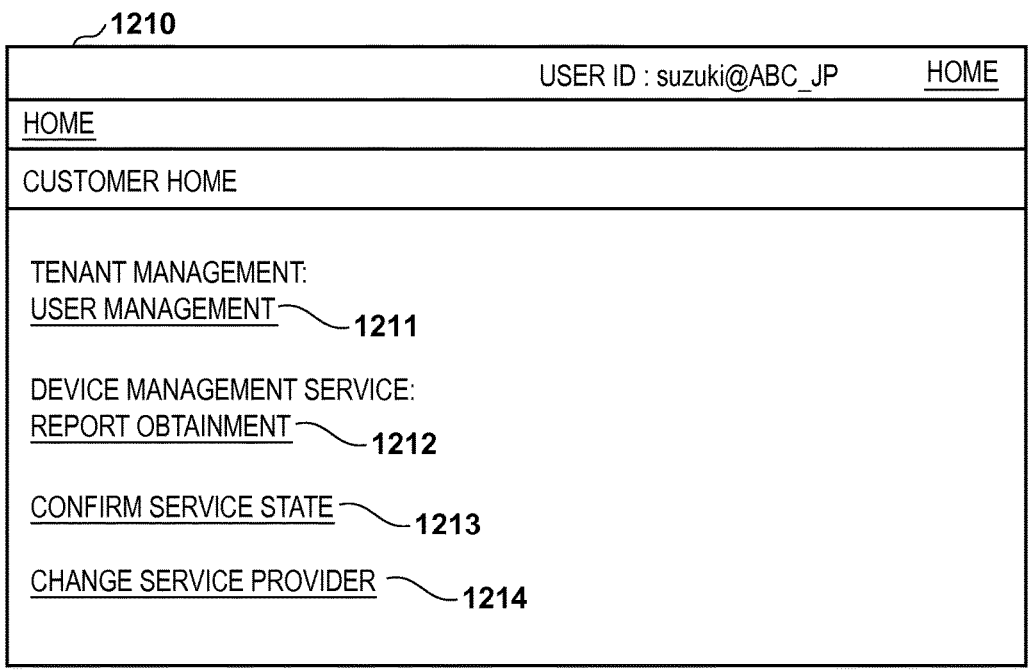

FIG. 12B is a diagram illustrating an example of a customer home page 1210 displayed in the case where a user of a customer tenant has logged in. Item 1211 indicates a link to a customer tenant user management screen, and when this item is selected by the user using a pointer or the like, the screen transitions to a user management screen. Although the user management screen is not shown here, this screen is a screen that enables customer tenant users to be added, changed, and removed. Setting a user ID and password in the user management screen makes it possible to add and change a user, and the added/changed user information is stored in the user management table 4022 illustrated in FIG. 5B.

Item 1212 indicates a link to a report obtainment screen, and when this item is selected by the user using a pointer or the like, the screen transitions to a report obtainment screen. The report obtainment screen is a screen from which a report generated by the service provider that provides a service to the customer can be downloaded. Item 1213 indicates a link to a service state confirmation screen. Although not shown here, the service state confirmation screen is a screen that enables the user to confirm the state of a service provided to a customer and a grace period when a service provider is canceled. The state 504, the first grace period 506, and the second grace period 507 of the tenant management table 4021 are displayed in the service state confirmation screen. Item 1214 indicates a link to a service provider changing screen. The service provider changing screen is a screen that enables the service provider that is providing a service to a customer to be changed.

Next, a process for migrating customer data when a service provider is canceled will be described. For example, assume that a service provider tenant SP_NY (corresponding to a migration destination) has a contract for a device management service with a customer ABC_Corp. When a user choi of the service provider SP_NY accesses the managing server 103 from the host computer 101 and logs in, the home page screen 1200 illustrated in FIG. 12A is displayed. When the user then selects the link for customer tenant registration 1201 in the home page screen 1200, the customer tenant registration screen 1300 illustrated in FIG. 13 is displayed.

Customer Registration Process

FIG. 16 is a flowchart illustrating steps in a customer registration process. The customer registration process will be described with reference to FIG. 16.

Figure 13:
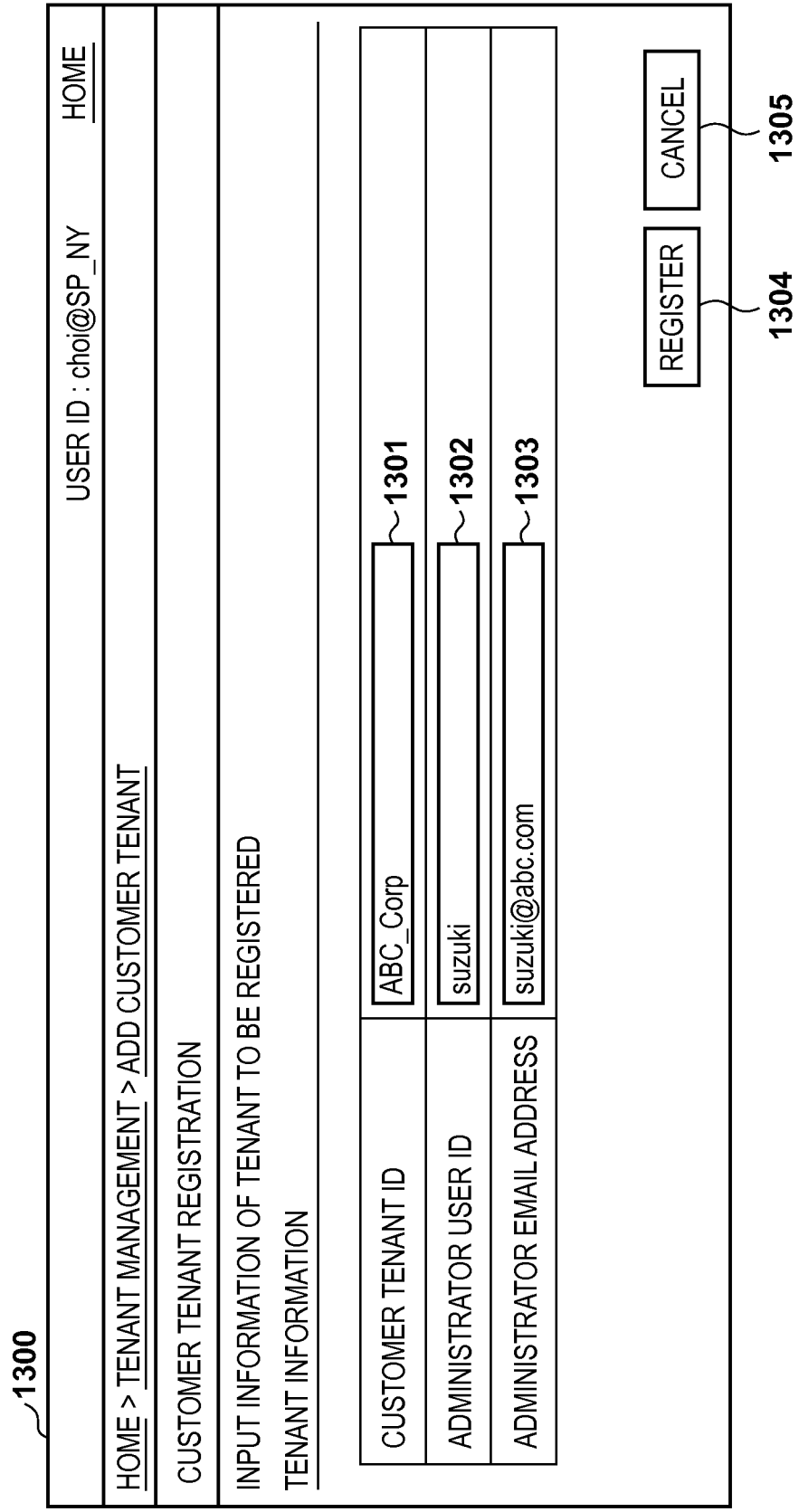
FIG. 13 is a diagram illustrating a customer tenant registration screen.

In S1601, upon accepting the selection of the link of the customer tenant registration 1201 in the home page screen 1200, the host computer 101 displays the customer tenant registration screen 1300 illustrated in FIG. 13. In S1602, the host computer 101 accepts the input of a customer tenant ID 1301, a user ID 1302 of an administrator of the customer tenant, and an email address 1303 of the administrator, through the customer tenant registration screen 1300. Furthermore, when a register button 1304 is pressed, customer tenant registration request information is set in an HTTP request and sent to the managing server 103. The CPU 201 of the managing server 103 receives the HTTP request via the interface unit 401, checks the input information, and if there are no problems, sends a customer tenant registration request to the tenant/user management unit 402 and refers to the tenant management table 4021.

In S1603, the CPU 201 determines the state of the customer tenant. Here, in the case where it is determined that the input customer tenant ID is not registered, the process moves to S1606, where the customer tenant is newly registered. In S1606, the CPU 201 adds a record, in which the input customer tenant ID and administrator user ID are set, to the tenant management table 4021. In the tenant management table 4021, "customer" is set for the tenant type 502 and "service not yet started" is set for the state 504. Furthermore, the CPU 201 registers the input customer tenant ID, administrator user ID, and email address in the tenant ID 531, user ID 532, and email address 534, respectively, of the user management table 4022. Further still, the CPU 201 registers the input customer tenant ID in the customer tenant ID 901 of the tenant-by-tenant data table 4051 managed by the service provider tenant management unit 405.

In S1607, the CPU 201 adds a record, in which the input customer tenant ID and service provider tenant ID of the tenant to which the logged-in user belongs are registered, to the customer tenant 701 and the service provider tenant 702 in the access authority management table 4031 managed by the access permission management unit 403. The access permission state 703 is set to "not permitted" at this time.

In S1608, the CPU 201 sends, to the email address 1303 of the administrator in the customer tenant registration screen 1300, an email for notifying the administrator of the customer tenant of service usage start guidance and a data access permission request for the service provider, after which the process of FIG. 16 ends.

In the case where it is determined in S1603 that the customer tenant is already registered and the state 504 in the tenant management table 4021 is "service being provided" or "service not yet started", the service has already been started for that customer, the service is waiting to be started, or the like. Accordingly, in S1604, the CPU 201 determines that an error has occurred, cancels the customer registration process, and then ends the process illustrated in FIG. 16.

In the case where it is determined in S1603 that the customer tenant is already registered and the state 504 in the tenant management table 4021 is "service stopped", the service provider has been canceled and the service provided to the customer has been stopped. In this case, in S1605, the CPU 201 determines whether or not the user ID 1302 of the administrator that has been input is the same as the administrator ID 503 already registered in the tenant management table 4021. In the case where it is determined that the IDs are not the same, the request is assumed to be incorrect, and the process moves to S1604. On the other hand, in the case where it is determined that the IDs are the same, it is determined that an operation for switching service providers is being carried out, and the process moves to S1607. In other words, although it is not necessary to newly register the customer tenant, the migration destination service provider is registered and set in the access authority management table 4031 and an email is sent to the customer tenant administrator in S1607 and S1608.

When the customer registration process of FIG. 16 ends, the CPU 201 generates HTML data for a customer tenant registration result screen (not shown) and sends the data to the Web browser 301 of the host computer 101. Although the foregoing describes the customer tenant ID as "ABC_Corp", the format thereof and so on are not particularly limited.

Next, a case where the service provider user has selected the link for customer management 1202 in the home page screen 1200 will be described. When the customer management 1202 link is selected, the customer management screen 1400 is displayed.

In the customer management screen 1400, a list of customer tenants managed by the service provider tenant (SP_NY) to which the logged-in user belongs is displayed. The customer management screen 1400 is generated by referring to the tenant-by-tenant data table 4051, the tenant management table 4021, and the customer tenant-by-customer tenant data table 4041 of the service provider tenant (SP_NY) to which the logged-in user belongs.

In FIG. 14, the customer tenant ID 901 of the tenant-by-tenant data table 4051 is displayed in a customer tenant ID 1403. Meanwhile, the state 504 in the tenant management table 4021 is displayed in a service state 1404. Furthermore, a total number of devices managed by the customer tenant-by-customer tenant data table 4041 is displayed in a device number 1405.

An operation select button 1406 is provided for each customer tenant, and when this button is pressed, a customer operation menu 1407 for specifying operations for the corresponding customer tenant is displayed. The customer operation menu 1407 displays a menu, for the service provider tenant to which the logged-in user belongs, based on whether or not access is permitted from the customer tenant for which the "operation selection" button 1406 has been pressed. Here, whether access is permitted is determined based on the access permission state 703 in the access authority management table 4031 illustrated in FIG. 7.

FIG. 14 is an example of a screen displayed when the user of the service provider SP_NY logs in, and a customer operation menu for a customer tenant XRC_US is displayed. In the customer operation menu, access from the customer XRC_US is permitted, and thus menus for device management 1408, report generation 1409, and agent management 1410 are displayed. When one of the device management 1408, report generation 1409, and agent management 1410 is selected, the screen transitions to a screen for the selected customer tenant to use the corresponding service function. A cancel button 1401 is a button for canceling the registration of the customer tenant selected using a radio button 1402 in a customer list.

Access Permission Process Performed by Customer Tenant

Next, access permission performed by a customer tenant user will be described. FIG. 17 is a flowchart illustrating steps in an access permission process when a menu is displayed. For example, when the customer tenant user (administrator) that received the email notification in S1608 accesses and logs into the managing server 103 from the host computer 101, the screen display request including the ID of the customer tenant to which the user belongs is sent to the managing server 103. The CPU 201 of the managing server 103 sets the screen display request information in the session information through the interface unit 401, and forwards the screen display request to the access permission management unit 403.

In S1701, the CPU 201 obtains, from the access authority management table 4031 managed by the access permission management unit 403, an access permission record in which the customer tenant ID included in the screen display request matches the customer tenant 701. In S1702, the CPU 201 determines whether or not the access permission state 703 in the access permission record is "not permitted". Here, the process moves to S1703 in the case where it is determined that the state is "not permitted", whereas the process moves to S1708 in the case where it is determined that the state is not "not permitted".

In S1703, the CPU 201 generates HTML data and sends the data to the Web browser 301 of the host computer 101 via the interface unit 401 in order to display an access permission approval screen (not shown).

The tenant ID of a service provider that can be permitted access (a service provider tenant 902 in the access authority management table 4031) is displayed in the access permission approval screen of the host computer 101. Furthermore, a button for accepting, from the user, an instruction as to whether or not to permit access to that service provider is displayed in the access permission approval screen. Upon accepting an instruction for permitting access in the access permission approval screen, in S1704, the host computer 101 sends an access permission approval request to the managing server 103. The process then moves to S1705.

Upon receiving the access permission approval request from the host computer 101, in S1705, the CPU 201 forwards the request to the access permission management unit 403. An access permission state 903 in that record in the access authority management table 4031 is then set to "permitted". In S1706, the CPU 201 sets the state 504 of that customer tenant in the tenant management table 4021 managed by the tenant/user management unit 402 to "service being provided".

In S1707, the CPU 201 executes a service provider migration process, illustrated in FIG. 22. The processing of step S1707 will be described later.

When the aforementioned processing ends, in S1708, the CPU 201 confirms the state 504 of the customer tenant in the tenant management table 4021 and determines whether or not the state is "service stopped". Here, the process moves to S1709 in the case where it is determined that the state is "service stopped", whereas the process moves to S1710 in the case where it is determined that the state is not "service stopped". In S1709, the CPU 201 displays a warning screen indicating that the state is still "service stopped", and ends the processing illustrated in FIG. 17. In S1710, the CPU 201 displays a screen the user of the customer tenant attempted to display using the screen display request stored in the session information. In the case where there is no particular specification here, a predetermined menu screen (a screen indicating that the migration is complete or the like) is displayed. Next, a service provider migration process will be described using, as an example, processing carried out in the case where the service provider (SP_NY) can no longer provide a service due to bankruptcy or the like and it has become necessary to cancel the service provider.

Service Provider Cancellation Instruction Process

Here, it is assumed that, for example, a user tony of SP_US, which is a service provider higher in the hierarchy than the service provider SP_NY, has specified the service provider SP_NY as a target of cancellation and instructed the cancellation.

Figure 18:
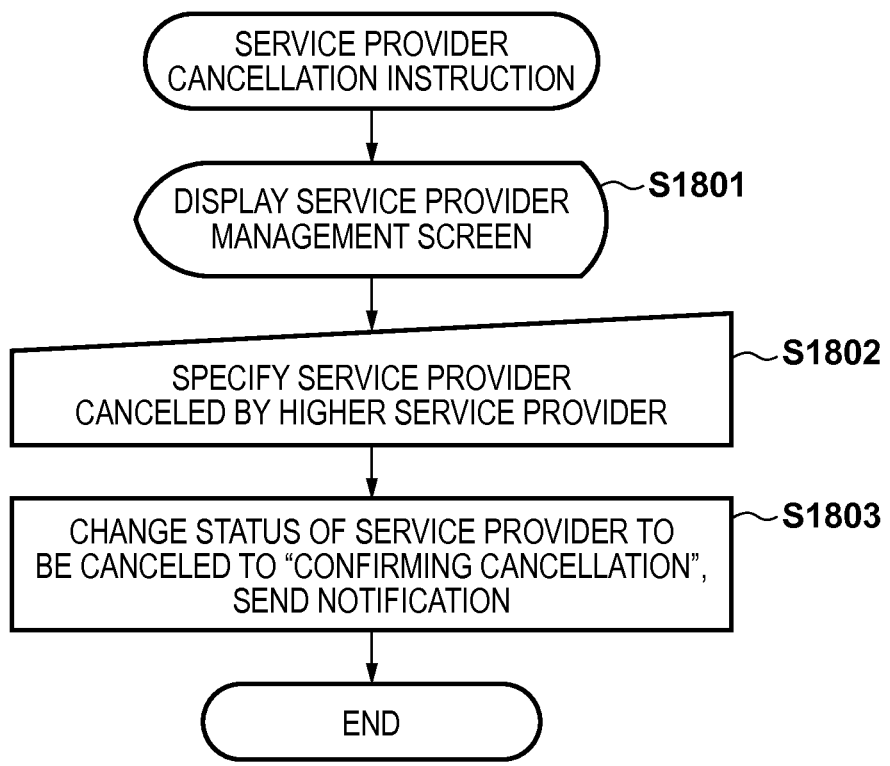
FIG. 18 is a diagram illustrating steps in a service provider cancellation instruction process.

FIG. 18 is a flowchart illustrating steps in the service provider cancellation instruction process. When the service provider user accesses the managing server 103 from the host computer 101 and logs in, the home page screen 1200 illustrated in FIG. 12A is displayed. In S1801, upon accepting the selection of the link for service provider management 1203 in the home page screen 1200, the CPU 201 displays the service provider management screen 1500 illustrated in FIG. 15A.

A list 1502 of service providers that are lower in the hierarchy than the service provider to which the logged-in user belongs is displayed in the service provider management screen 1500. The managing server 103 refers to the tenant hierarchy management table 4023 managed by the tenant/user management unit 402, and obtains the service providers lower in the hierarchy than the service provider to which the logged-in user belongs. In the examples illustrated in FIGS. 15A and 15B, the user tony of the service provider SP_US is logged in, and thus a list of the service providers lower in the hierarchy than the service provider SP_US is displayed. In other words, in the tenant hierarchy management table 4023 illustrated in FIGS. 6A and 6B, the higher tenant 601 is SP_US, and thus SP_NY and SP_DET are obtained as tenant IDs from the lower tenant 602. Furthermore, the CPU 201 obtains the states of the corresponding lower tenants by referring to the tenant management table 4021, and displays these in a state 1503. The CPU 201 also counts the number of customer tenants managed by the corresponding lower tenants by referring to the access authority management table 4031 managed by the access permission management unit 403, and displays this number in a contracted customer number 1504.

An "add service provider" button 1501 is used to transition to a screen (not shown) for adding a new service provider tenant. When a new service provider tenant is added, a new service provider tenant is added below the tenant to which the user that carried out the adding operation belongs.

A cancel button 1505 is a button provided for each service provider displayed in the service provider list 1502, and is pressed when accepting an instruction to cancel the corresponding service provider tenant. In S1802, upon detecting that the user has pressed the cancel button 1505 in the row for SP_NY, for example, the CPU 201 specifies the service provider SP_NY to be canceled, and the process moves to S1803.

In S1803, the CPU 201 sets the state 504 of the service provider to be canceled to "confirming cancellation" in the tenant management table 4021. Furthermore, the CPU 201 sets a date a predetermined period after the date on which the cancellation instruction was made in the cancellation rejection able period 505. A date one month later is set, for example. "2014 Apr. 24" is set for the tenant 512 illustrated in FIGS. 5A and 5B. Then, the CPU 201 notifies, via email, the administrator of the service provider to be canceled that there has been a cancellation instruction.

Service Provider Cancellation Rejection Process

When rejecting the cancellation of a service provider that is a target of cancellation, the administrator of the service provider that is the target of cancellation carries out a cancellation rejection operation.

Figure 19:
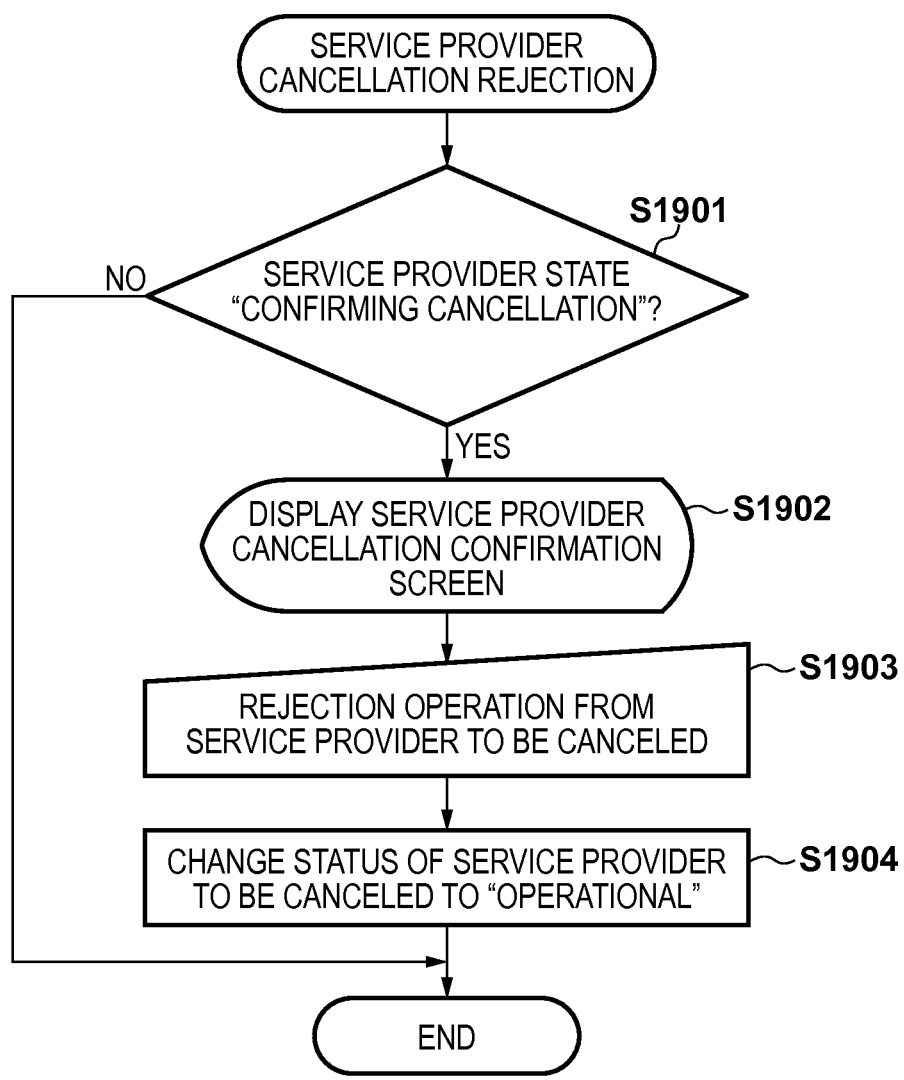
FIG. 19 is a diagram illustrating steps in a service provider cancellation rejection process.

FIG. 19 is a flowchart illustrating steps in the service provider cancellation rejection process. The administrator (choi) of the service provider that is the target of cancellation (SP_NY) is informed that a cancellation instruction has been made by the email sent in S1803 of FIG. 18. At this time, the administrator (choi) of the service provider that is the target of cancellation (SP_NY) accesses and logs into the managing server 103 from the host computer 101.

After logging in, in S1901, the CPU 201 refers to the tenant management table 4021 managed by the tenant/user management unit 402 and determines whether or not the state 504 of the service provider is "confirming cancellation". In the case where it is determined that the state is not "confirming cancellation", the processing in FIG. 19 ends. However, in the case where it is determined that the state is "confirming cancellation", the process moves to S1902, where the CPU 201 displays a service provider cancellation confirmation screen 1510, indicated in FIG. 15B. As illustrated in FIG. 15B, an approve button 1511 for approving the cancellation and a reject button 1512 for rejecting the cancellation are displayed in the service provider cancellation confirmation screen 1510.

When it is detected in S1903 that the user has pressed the reject button 1512, the process moves to S1904. In S1904, the CPU 201 changes the state 504 of the tenant management table 4021 to "operational" for the service provider tenant that was the target of cancellation, deletes the cancellation rejection able period 505, and removes the "confirming cancellation" state. The processing of FIG. 19 ends after the process of S1904.

Service Provider Cancellation Process

Next, a cancellation process carried out in the case where the cancellation rejection operation has not been carried out will be described with reference to FIGS. 20 and 21. In the present embodiment, the managing server 103 executes the service provider cancellation process periodically, every predetermined interval of time.

In S2001, the CPU 201 refers to the tenant management table 4021 managed by the tenant/user management unit 402 and obtains a list of service providers whose states 504 are "confirming cancellation". In S2002, the CPU 201 determines whether or not there is a service provider tenant, among the service providers obtained in S2001, whose cancellation rejection able period 505 has expired. In the case where it is determined that such a tenant is not present, the processing of FIG. 20 ends, whereas in the case where it is determined that such a tenant is present, the process moves to S2003.

In S2003 to S2005, the CPU 201 executes a service provider switch pre-process indicated in FIG. 21 for each customer tenant managed by the service provider tenant whose cancellation rejection able period 505 has expired (S2004). In S2003, the CPU 201 refers to the access authority management table 4031 managed by the access permission management unit 403, and obtains information of the customer tenant managed by the service provider tenant whose cancellation rejection able period 505 has expired.

Service Provider Switch Pre-Process

FIG. 21 is a flowchart illustrating steps in a service provider switch pre-process indicated in S2004 of FIG. 20.

In S2101, the CPU 201 deletes personal information and so on related to the service provider that has been canceled from the customer tenant-by-customer tenant data table 4041 of the corresponding customer tenant managed by the customer tenant management unit 404. The notification destination email address 805 in FIG. 8A, for example, is a target of this deletion. In S2102, the CPU 201 deletes personal information, confidential information, and so on related to the service provider from the tenant-by-tenant data table 4051 managed by the service provider tenant management unit 405. The salesperson 904 in FIG. 9A, the template file 923 in FIG. 9B, and so on, for example, are targets of this deletion.

In other words, in S2101 and S2102, personal information and the like that can change in response to the service provider changing due to a cancellation or the like is deleted. In the present embodiment, a list that defines which items in which table are to have their data deleted may be prepared in advance, and the CPU 201 may determine the targets for deletion by referring to that list during the processes of S2101 and S2102.

In S2103, the CPU 201 extracts a target amount of migration data from the tenant-by-tenant data table 4051 from which the information saved in the service provider tenant management unit 405 and targeted for deletion in S2102 (in other words, information aside from information to be migrated) has been deleted. The data is then converted into migration data in a format that can be saved by the customer tenant management unit 404. In S2104, the CPU 201 forwards the converted migration data to the customer tenant management unit 404 from the service provider tenant management unit 405, associates the data with the customer, and saves the data in the service provider tenant data management table 4042. The conversion may be encryption that can be decoded by the customer tenant management unit 404 using a proprietary method, for example. Through this, the migration data can be held safely even when a service provider tenant is not present due to a cancellation or the like.

FIG. 10 is a diagram illustrating an example of the service provider tenant data management table 4042. In FIG. 10, the table name is ABC_Corp.migration_data, indicating that the table is a migration data table (migration data table) of the tenant ABC_Corp.

DataID 1001 is identification information for identifying each piece of migration data. One type of migration data is shown in FIG. 10. For example, the case where the DataID is set to SP_DATA indicates that the migration data thereof is data for the service provider.

Data 1002 indicates the content of the migration data. For example, the salesperson 904 is deleted in S2102, and thus of the ABC_Corp information illustrated in FIGS. 9A and 9B, the information aside from the information to be deleted is extracted as the information to be migrated. The content indicated in Data 1002 of the migration data 1011 illustrated in FIG. 10 is then saved in, for example, an XML format that can be saved by the customer tenant management unit 404.

In the present embodiment, as a result of the foregoing processing, even in the case where a service provider tenant has been removed from the system due to a cancellation or the like, migration data to be migrated to another service provider is held by the customer tenant management unit 404 in association with that customer. At this time, information that is dependent on the service provider (personal information and the like) is not held, and thus the risk that confidential information such as personal information will be leaked can be reduced.

FIG. 21 will now be discussed again. In S2105, the CPU 201 sets an operation expiration period for the device management agent 106 in the first grace period 506 for that customer tenant in the tenant management table 4021. Furthermore, in S2106, the CPU 201 sets an expiration period for holding the customer data in the second grace period 507. By setting such an expiration period, the customer data will be managed in accordance with the access authority indicated in FIG. 7 during the second grace period even, for example, in a state where there is no managing service provider tenant. Accordingly, the customer data can be held safely until the service provider tenant to which the data is to be migrated is determined.

In S2107, the CPU 201 sets the state 504 of that customer tenant in the tenant management table 4021 managed by the tenant/user management unit 402 to "service stopped". In S2108, the CPU 201 deletes a record indicating an access permission relationship between the customer tenant and the service provider tenant from the access authority management table 4031 managed by the access permission management unit 403.

In the case where the state 504 of the customer tenant has been set to "service stopped", the process of S1608 in the customer registration process illustrated in FIG. 16 will be carried out if the migration destination service provider attempts to register that customer tenant. In other words, after an email providing guidance of the start of service usage and communicating a data access permission request to the service provider has been sent to the email address of the customer tenant administrator, the migration destination service provider can register the customer tenant. When another service provider then registers the customer tenant, the migration process of S1707 in the access permission process carried out when the menu is displayed, as indicated in FIG. 17, can be carried out.

Migration Process

FIG. 22 is a flowchart illustrating steps in the migration process of S1707 indicated in FIG. 17. In S2201, the CPU 201 determines whether or not migration data is saved in the migration data format in the service provider tenant data management table 4042 managed by the customer tenant management unit 404. In the case where it is determined that the migration data is saved, the process moves to S2202, whereas in the case where it is determined that the migration data is not saved, the process moves to S2205. For example, in the case where it is determined that a record for the SP_DATA indicated in FIG. 10 is saved, the process moves to S2202, whereas in the case where it is determined that the record is not saved, the process moves to S2205.

In S2202, the CPU 201 obtains the migration data from the service provider tenant data management table 4042 and sends the data to the service provider tenant management unit 405. In S2203, the CPU 201 converts the migration data sent to the service provider tenant management unit 405 into the format handled by the tenant-by-tenant data table 4051, and sets (reflects) the items in the tenant-by-tenant data table 4051 accordingly. For example, the CPU 201 converts the migration data into the XML format, and sets the data in the customer name 902 and the customer contact 903 of the tenant-by-tenant data table 4051 corresponding to the migration destination service provider tenant.

In S2204, the CPU 201 deletes the migration data from the service provider tenant data management table 4042 managed by the customer tenant management unit 404. In S2205, in the case where the first grace period 506 and the second grace period 507 are set for the corresponding customer tenant in the tenant management table 4021 managed by the tenant/user management unit 402, the CPU 201 deletes that information.

As described thus far, according to the present embodiment, in the case where a service provider has been canceled due to bankruptcy or the like, the information saved in the service provider tenant can be migrated safely to a tenant in a new service provider that will provide a service to the customer. At this time, saving the data to be migrated in the customer tenant management unit 404 makes it possible to continue to hold the migration data for a set period of time, even if the tenant information of the bankrupted service provider is deleted. In addition, the CPU 201 of the managing server 103 periodically, at predetermined time intervals, determines whether or not a customer tenant for whom the second grace period has expired is present in the tenant management table 4021 managed by the tenant/user management unit 402. In the case where it is determined that such a customer tenant is present, that customer tenant is deleted.

In the case where it is determined that an authentication has been successful in an authentication process carried out by the managing server 103 when there is communication from the device management agent 106, the CPU 201 of the managing server 103 verifies the first grace period 506 of the tenant management table 4021. Here, in the case where the first grace period 506 has expired, the device management agent 106 of that customer tenant cannot operate, and thus an operation unable error is returned to the device management agent 106. The device management agent 106 stops operating upon receiving the operation unable error.

A case where a customer tenant cancels a contract with a service provider and switches to another service provider will now be described as another use case. First, an administrator user of the customer tenant logs into the managing server 103, and a portal service provider changing screen is displayed when a portal service provider changing menu 1214 is selected in a home page 1210.

The portal service provider changing screen accepts an instruction as to whether or not the user agrees to switch service providers. In the case where an instruction indicating that the user agrees to the switch has been accepted, the tenant/user management unit 402 of the managing server 103 executes the service provider switch pre-process illustrated in FIG. 21. As a result, the relationship with the service provider is canceled, and the migration data is saved in the customer tenant management unit 404. Thereafter, when the new service provider registers the customer tenant, the migration data is sent to and loaded in the new service provider tenant to complete the migration, in the same manner as in the case where a service provider has gone bankrupt.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084966, filed Apr. 16, 2014, which is hereby incorporated by reference herein in its entirety.

What is claimed is:

1. A managing system in which a service provider manages, by using managing tenants and customer tenants for managing first customer information which is concerned with customers of the service provider, information for managing a customer that uses a service in the managing system, the managing system comprising:
   at least one processor; and
   a memory coupled to the at least one processor and having instructions stored thereon that, when executed by the at least one processor, cause the managing system to:
   accept an instruction to delete a first managing tenant for a first service provider from the managing system;
   delete a part of information of management information of the first managing tenant and second customer information unique to a customer managed by the first managing tenant;

transfer the management information and the second customer information except for the deleted part of information as transfer information of the first managing tenant, from the first managing tenant to a customer tenant for the customer, in a case where the instruction is accepted;

hold the transfer information using the customer tenant;

manage the transfer information by using an access authority assigned to information of the customer, the access authority being different from an access authority assigned to information of the first service provider, while the transfer information is held using the customer tenant;

transfer the held transfer information of the first managing tenant to a second managing tenant for a second service provider in a case where the second managing tenant is determined to be a destination of a transfer from the first managing tenant; and delete the held second customer information as the transfer information by using the customer tenant in a case where a predetermined period has elapsed without the second managing tenant being determined to be the destination of the transfer from the first managing tenant after an instruction to delete has been accepted.

2. The managing system according to claim 1, wherein the instructions, when executed by the at least one processor, further cause the managing system to convert a format of data containing the transfer information of the first managing tenant, and wherein the data whose format has been converted is held.

3. The managing system according to claim 1, wherein the second customer information includes at least one of information for identifying the customer and template information used for a report, wherein the report is provided to the customer.

4. The managing system according to claim 1, wherein the transfer information of the first managing tenant includes at least one of a monitoring condition for an event occurring in a device managed by the customer and date information related to service usage of the customer.

5. The managing system according to claim 1, wherein the first and second managing tenants manage customers, which use services provided by the first and second managing tenants, by using tables, and wherein the held transfer information of the first managing tenant is applied to the table of the second managing tenant.

6. The managing system according to claim 1, wherein the instructions, when executed by the at least one processor, further cause the managing system to obtain permission for transferring the first managing tenant from the customer, in a case where an instruction to delete the first managing tenant is accepted from a third managing tenant located higher than the first managing tenant in a hierarchy, and wherein, in a case where permission to transfer has been obtained, information included in the management information of the first managing tenant and the second customer information is held as the transfer information of the first managing tenant.

7. A managing method for using a managing tenant to manage information that is stored in a storage device used by a managing system and is used to manage a customer that uses a service in the managing system, the method comprising:

accepting an instruction to delete a first managing tenant for a first service provider from the managing system;

deleting a part of information of management information of the first managing tenant and second customer information unique to a customer managed by the first managing tenant;

transferring the management information and the second customer information except for the deleted part of information as transfer information of the first managing tenant, from the first managing tenant to a customer tenant for the customer, in a case where the instruction is accepted;

holding the transfer information using the customer tenant;

managing the transfer information by using an access authority assigned to information of the customer, the access authority being different from an access authority assigned to information of the first service provider, while the transfer information is held using the customer tenant;

transferring the held transfer information of the first managing tenant to a second managing tenant for a second service provider in a case where the second managing tenant is determined to be a destination of a transfer from the first managing tenant; and deleting the held second customer information as the transfer information by using the customer tenant in a case where a predetermined period has elapsed without the second managing tenant being determined to be the destination of the transfer from the first managing tenant after an instruction to delete has been accepted.

* * * * *